United States Patent
Yamazaki et al.

(10) Patent No.: US 6,384,983 B1
(45) Date of Patent: May 7, 2002

(54) IMAGE DISPLAY APPARATUS

(75) Inventors: Shoichi Yamazaki, Yokohama; Kazutaka Inoguchi, Kawasaki, both of (JP)

(73) Assignee: Mixed Realty Systems Laboratory Inc., Yokohama (JP)

(*) Notice: Subject to any disclaimer, the term of this patent is extended or adjusted under 35 U.S.C. 154(b) by 0 days.

(21) Appl. No.: 09/658,665

(22) Filed: Sep. 8, 2000

(30) Foreign Application Priority Data

Nov. 19, 1999 (JP) .......................................... 11-329597

(51) Int. Cl.[7] .......................... G02B 27/14; G02B 5/04; G09G 5/00
(52) U.S. Cl. ...................... 359/631; 359/630; 359/837; 345/8
(58) Field of Search ................................ 359/630, 631, 359/633, 636, 639, 640, 833, 834, 837; 345/7, 8

(56) References Cited

U.S. PATENT DOCUMENTS

| | | | | |
|---|---|---|---|---|
| 5,596,433 A | * | 1/1997 | Konuma | 359/631 |
| 5,701,202 A | * | 12/1997 | Takahashi | 359/631 |
| 5,875,056 A | * | 2/1999 | Takahashi | 359/633 |
| 6,023,373 A | * | 2/2000 | Inoguchi et al. | 359/623 |
| 6,239,915 B1 | * | 5/2001 | Takagi et al. | 359/629 |
| 6,317,267 B1 | * | 11/2001 | Takahashi | 359/630 |

FOREIGN PATENT DOCUMENTS

JP P2001-147400 A * 5/2001 .......... G02B/27/02

* cited by examiner

*Primary Examiner*—Georgia Epps
*Assistant Examiner*—David N. Spector
(74) *Attorney, Agent, or Firm*—Fitzpatrick, Cella, Harper & Scinto

(57) ABSTRACT

An image display apparatus has a display device for displaying image information and an optical system for guiding light from the display device to the eye. The optical system has a prism body of a positive refractive power including three or more surfaces with refractive powers differing depending upon azimuthal angles. The surface of the prism body closest to the display device is a surface in which refractive powers thereof differ depending upon azimuthal angles and in which a local curvature radius area having a positive refractive power on a local generating-line section (meridional section) is interposed between local curvature radius areas having a negative refractive power on the local generating-line section (meridional section).

11 Claims, 5 Drawing Sheets

IMAGE DISPLAY APPARATUS

BACKGROUND OF THE INVENTION

1. Field of the Invention

The present invention relates to an image display apparatus and, more particularly, to the image display apparatus, for example, which is constructed using a liquid crystal display element as a display means for displaying an image and constructed to permit an observer to observe an enlarged image of image information displayed on the display element through a display optical system having a free surface prism properly set and which is suitably applicable to head-mounted displays (which will be referred to hereinafter as "HMDs"), goggle type displays, and so on.

2. Related Background Art

A variety of proposals have been made heretofore about the image display apparatus of the head-mounted type, so called the head-mounted displays, which permitted the observer to observe an enlarged virtual image of the image information displayed on the image display element of liquid crystal or the like, for example, using an optical element provided with an entrance surface, a plurality of reflecting surfaces, and an exit surface in surfaces of a transparent body (prism).

As the image display apparatus of this head-mounted display type, for example, configurations of optical systems, particularly, excellent in terms of size reduction are proposed in Japanese Patent Application Laid-Open Nos. 7-333551, 8-179238, 8-234137, and so on.

On the other hand, the HMDs with wider angles of view using a prism having surfaces with refractive powers differing depending upon azimuthal angles (such surfaces will be referred to hereinafter as free curved surfaces and the prism as a free surface prism), are proposed, for example, in Japanese Patent Application Laid-Open Nos. 10-75407, 9-146037, (10-282421,) and so on. In the HMDs proposed in these applications, the display optical system is constructed in such structure that a lens separate from the free surface prism is interposed between the eyes and the free surface prism, thereby achieving the wide horizontal angle of view of about 60°.

In the field of the image display apparatus such as the HMDs or the like, an important issue is to decrease the size and weight of the entire apparatus, because the apparatus is mounted on the observer's head. Another important issue is to allow the observer to observe the image information displayed on the display means, with a wide angle of view and in good order.

The display optical system suggested in Japanese Patent Application Laid-Open No. 10-75407 includes a lens between the eyes and the free surface prism. This increases the size of the display optical system. In order to form a seethrough optical system for permitting observation of the outside, three prisms are necessary for establishing a nearly non-power seethrough optical system while achieving approximate agreement between the eye optical axis and the outside optical axis (FIG. 15 of Laid-Open No. 10-75407), and thus the entire optical system tends to become great.

As apparent from the path diagram, distortion of the display optical system tends to become great.

SUMMARY OF THE INVENTION

An object of the present invention is to provide an image display apparatus that permits establishment of a compact display optical system and good correction for distortion and various aberrations and that is optimal for the HMDs with wide angles of view.

Another object of the present invention is to provide an image display apparatus that permits observation of image information with a wide angle of view and with good image quality while decreasing the size of the entire apparatus and loss of light amount, by properly setting the structure of the display optical system including a free surface prism body for guiding light from the display means to the observer's eyes, in order to permit the observer to observe the image information displayed on the display means such as a liquid crystal display or the like.

An image display apparatus according to one aspect of the present invention is an image display apparatus comprising display means for displaying image information, and optical means for guiding light from the display means to the eye, wherein said optical means comprises a prism body of a positive refractive power having three or more surfaces with refractive powers differing depending upon azimuthal angles, and wherein a surface of the prism body closest to the display means is a surface in which refractive powers thereof differ depending upon azimuthal angles and in which a local curvature radius area having a positive refractive power on a local generating-line section (meridional section) is interposed between local curvature radius areas having a negative refractive power on the local generating-line section (meridional section).

In a further aspect of the present invention, said prism body comprises a transmitting surface, a reflecting surface, and a reflecting surface in the order named in the opposite direction to passage of light, from the surface closest to the eye, and refractive powers on a local sagittal section at hit points between the respective surfaces of the prism body and a reference ray are arranged in such arrangement that the transmitting surface of a negative refractive power, the reflecting surface of a positive refractive power, and the reflecting surface of a negative refractive power are arranged in the order named in the opposite direction to passage of light, from the eye side.

In a further aspect of the present invention, the following condition is satisfied by a refractive index Nd of a material of said prism body:

$$1.54 < Nd < 1.85.$$

In a further aspect of the present invention, the following condition is satisfied by an angle a between the reference ray and a tangent line to the surface is closest to the eye on the local generating-line section (meridional section) at the hit point between the the reference ray and the surface of said prism body closest to the eye;

$$70° < \alpha < 95°.$$

In a further aspect of the present invention, said prism body comprises a transmitting surface, a reflecting surface, and a reflecting surface arranged in the order stated from the surface closest to said display means, and refractive powers on the local generating-line section (meridional section) at a hit point on each surface of the prism body, of a ray passing the center of the eye and a most marginal image on the far side from the eye out of most marginal images on the local generating-line section (meridional section) of the display means, are arranged in such arrangement that the transmitting surface of a negative refractive power, the reflecting surface of a positive refractive power, and the reflecting surface of a positive refractive power are placed in the order stated from the display means side.

In a further aspect of the present invention, the surface closest to the eye is a surface having two functions of transmitting action and reflecting action.

An image display apparatus according to one aspect an of the present invention is an image display apparatus comprising display means for displaying image information, optical means for guiding light from the display means to the eye, and seethrough means for guiding light from the outside to the eye, wherein said optical means comprises a prism body of a positive refractive power comprised of three or more different surfaces, inclusive of two or more surfaces with refractive powers differing depending upon azimuthal angles, wherein said seethrough means is constructed in such structure that a correction prism is placed adjacent to or joined to the prism body in said optical means, that adjacent surfaces or joint surfaces are partially transmitting surfaces with little optical refractive power, and that the eye optical axis is approximately aligned with the outside optical axis, wherein a surface of the seethrough means closest to the outside is a decentered, curved surface which has a shape different from that of a surface of the seethrough means closest to the eye and in which refractive powers differ depending upon azimuthal angles, and wherein the following condition is satisfied by a curvature radius $1\_ry$ on a local generating-line section (meridional section) and a curvature radius $1\_rx$ on a local sagittal section at a hit point between a reference ray and the decentered, curved surface of the seethrough means closest to the outside:

$$|1\_rx| < |1\_ry|.$$

In a further aspect of the present invention, said correction prism is placed in an outside region of said prism body.

DETAILED DESCRIPTION OF THE PREFERRED EMBODIMENTS

Figure 1:
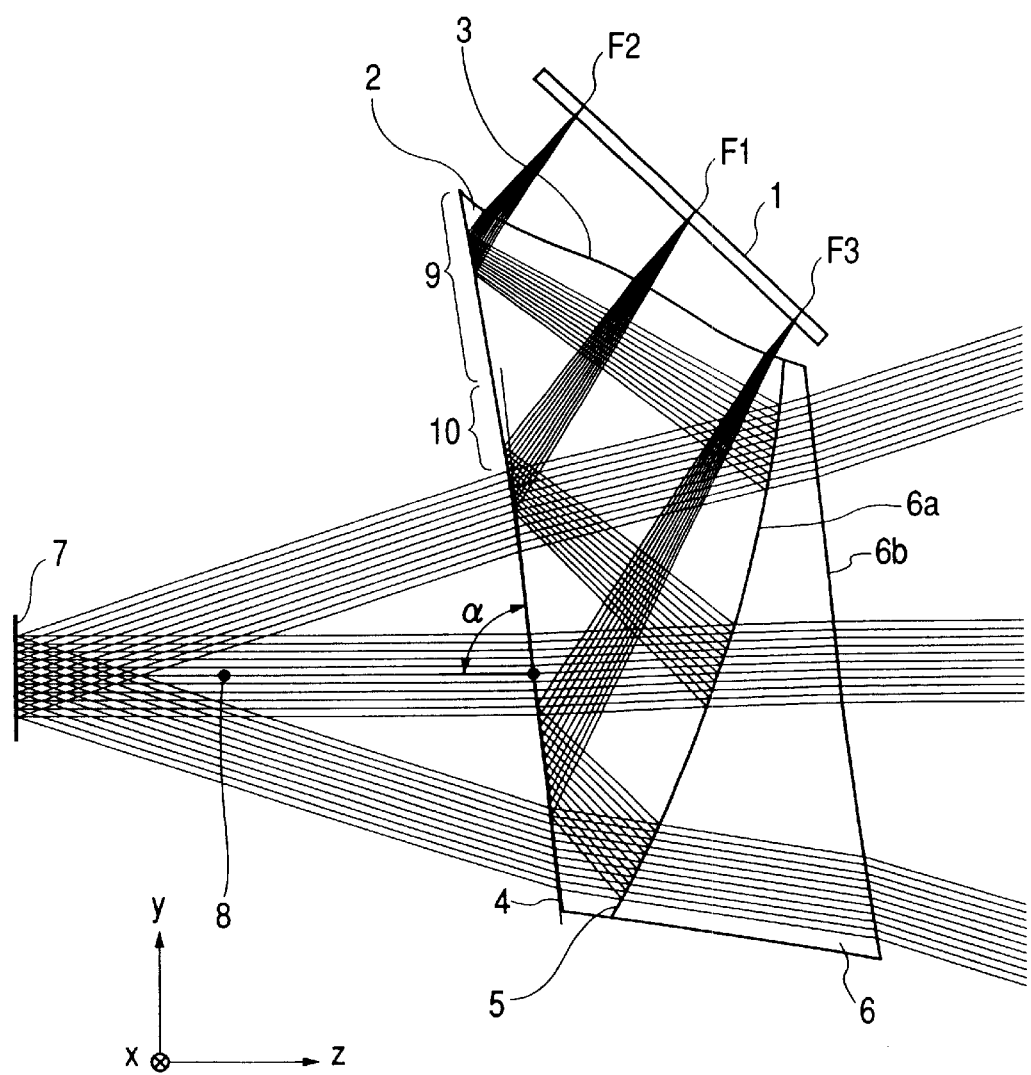
FIG. 1 is a schematic diagram to show the main part of an embodiment of the image display apparatus of the present invention.

FIG. 1 is a schematic diagram to show the main part of the image display apparatus as a basis of the present invention.

In FIG. 1, reference numeral 1 designates the display means for displaying an image including characters, graphics, etc., as an original image, which is comprised, for example, of a known liquid crystal display (LCD). Numeral 2 denotes a prism body (free surface prism body) of a positive refractive power having imaging action for guiding light from the display means 1 to the eyes (pupils) 7 of the observer. The light from the display means 1 is incident to an entrance surface 3 of the prism body 2, is then incident at an angle over the critical angle successively to a surface 4 and to a concave surface 5 to be totally reflected thereby, is incident thereafter at an angle of incidence below the critical angle this time to the surface 4 to emerge from the surface 4, and is guided to the eyes 7.

Three free curved surfaces are used for the entrance surface 3, the surface 4, and the concave surface 5 of the prism body 2, thereby controlling decentering aberration in a low level. In the other region than a region 9 with a reflective coating (an aluminum deposited film for 100% reflection) in the surface 4, the curved surface is designed so as to satisfy the both functions of a transmissive surface and a reflective surface depending upon the critical angle condition for all beams of the incident light, thereby attaining the bright display optical system without loss in the light amount throughout the entire surface of the surface 4.

The image information displayed on the display means 1 is observed as an enlarged virtual image through the prism body 2 from the pupil position 7.

Here the prism body 2 constitutes an element of the display optical system. When the image display apparatus of FIG. 1 is used as an observation apparatus for observation of only the image information displayed on the display means 1, the concave surface 5 of the prism body 2 is formed as a mirror reflective surface of a deposited film of Al, Ag, or the like.

In the present embodiment the prism body 2 is constructed so as to make use of two reflections, but the prism body 2 may also be constructed using three or more reflections.

When the optical system is constructed as a seethrough optical system as described hereinafter (which is an optical system permitting observation of both the image information of the display means and the image information of the outside), the concave surface 5 can be formed as a half mirror surface to guide beams from the outside directly into the concave surface 5, or a correction prism body 6 can be used, as illustrated in FIG. 1, so as to use beams having passed through the prism body 6 and the prism body 2.

When the image display apparatus of the present embodiment is used as a seethrough system for observation of both the image information displayed on the display means 1 and the image information of the outside, the correction prism body 6 is used.

The prism body 6 has a surface 6a of the same shape as the concave surface 5 of the prism body 2, and a light incident surface 6b, which is a plane, an aspherical surface, or a free curved surface.

The concave surface 5 of the prism body 2 and the surface 6a of the prism body 6 are comprised of a half mirror surface.

Beams from an object (not illustrated) in the outside are incident to the entrance surface 6b of the prism body 6, travel through the surface 6a, the concave surface 5, and the surface 4, and then are incident to the observer's pupils 7.

In the image display apparatus of FIG. 1, the observer can observe both the image information displayed on the display means 1 and the object in the outside, in a common field.

Figure 2:
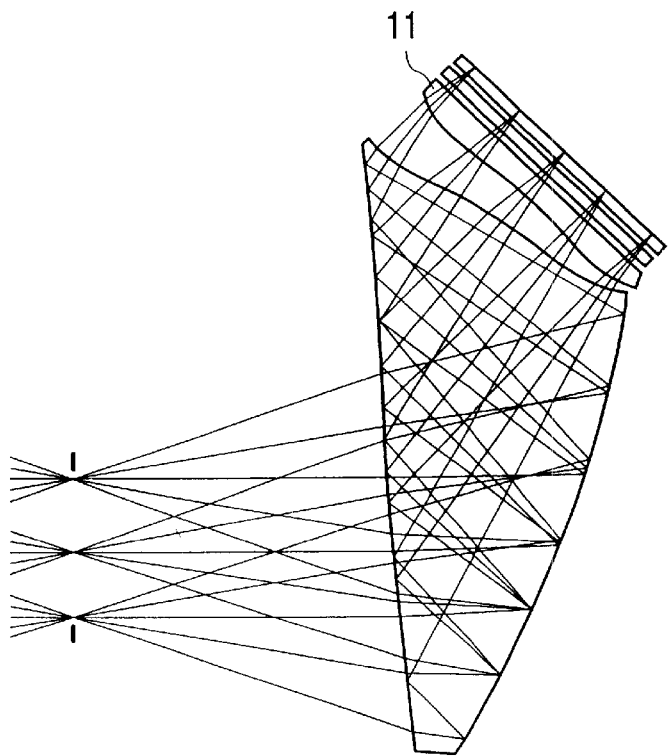
FIG. 2 is a schematic diagram to show the main part of Embodiment 1 of the image display apparatus of the present invention.
Figure 3:
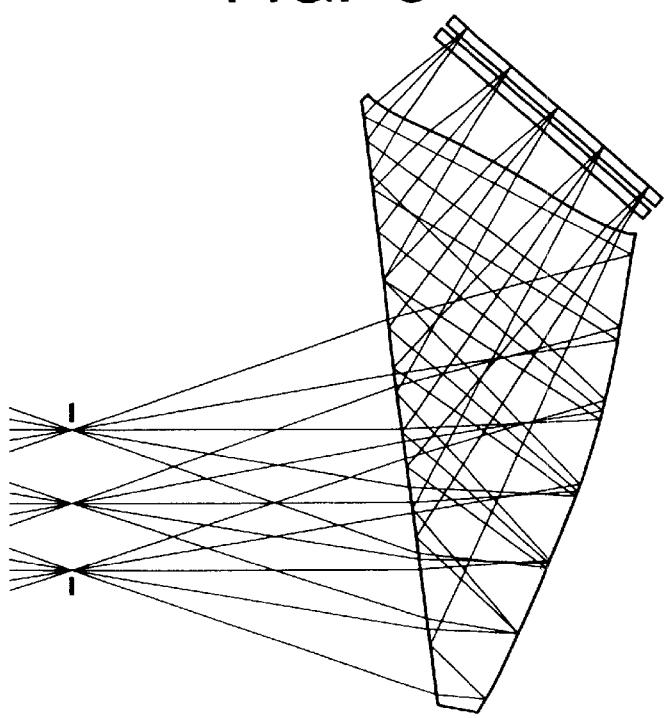
FIG. 3 is a schematic diagram to show the main part of Embodiment 2 of the image display apparatus of the present invention.
Figure 4:
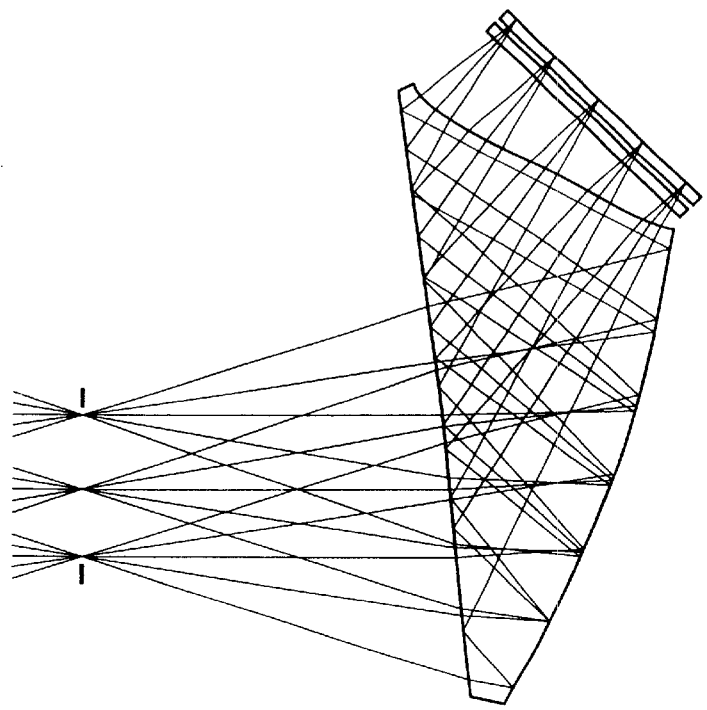
FIG. 4 is a schematic diagram to show the main part of Embodiment 3 of the image display apparatus of the present invention.
Figure 5:
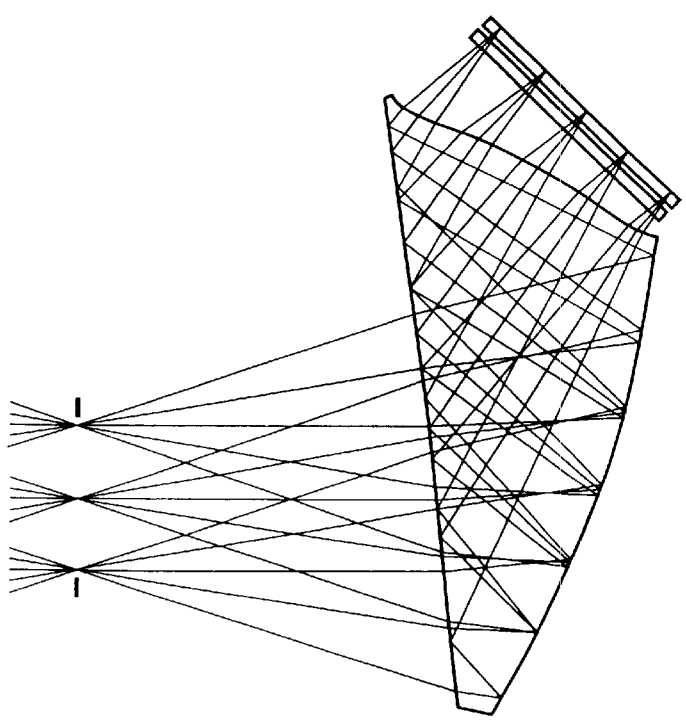
FIG. 5 is a schematic diagram to show the main part of Embodiment 4 of the image display apparatus of the present invention.
Figure 6:
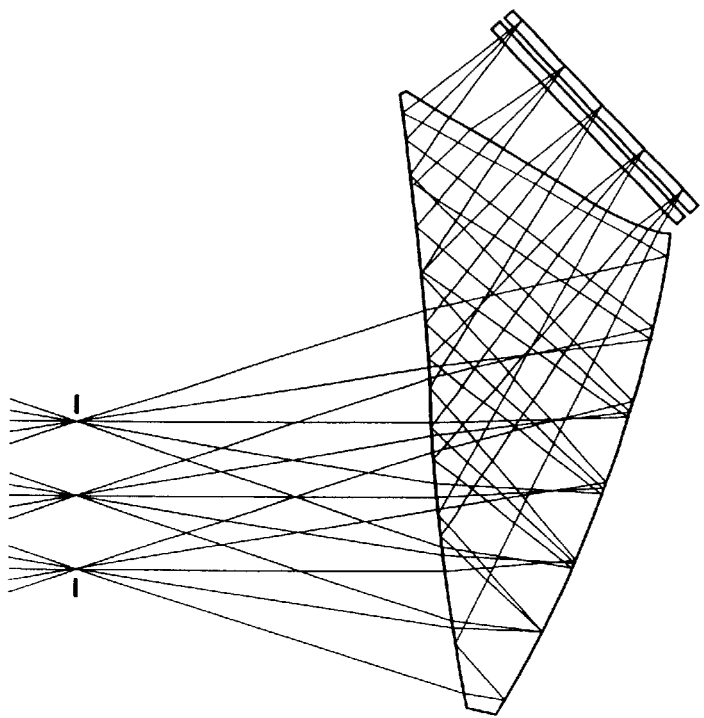
FIG. 6 is a schematic diagram to show the main part of Embodiment 5 of the image display apparatus of the present invention.
Figure 7:
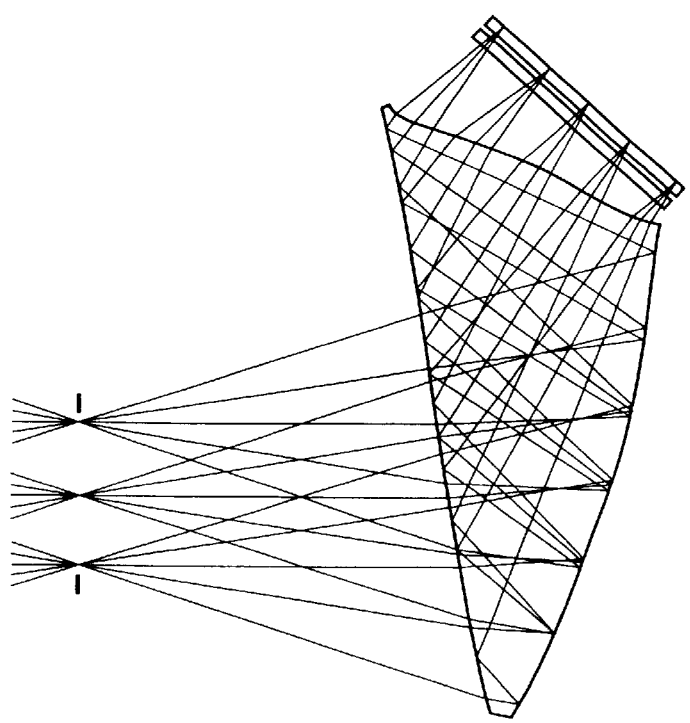
FIG. 7 is a schematic diagram to show the main part of Embodiment 6 of the image display apparatus of the present invention.
Figure 8:
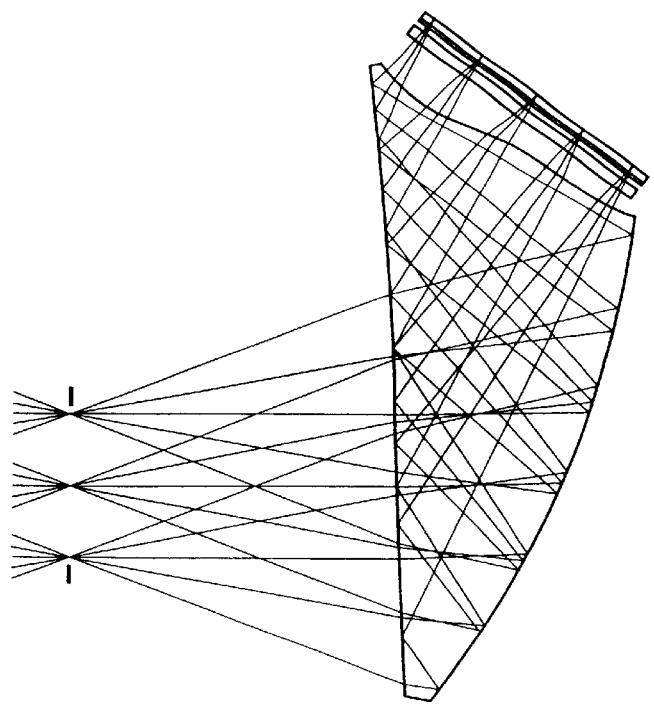
FIG. 8 is a schematic diagram to show the main part of Embodiment 7 of the image display apparatus of the present invention.

In the present embodiment a field lens 11 may be interposed between the display means 1 and the entrance surface 3 of the prism body 2, as illustrated in FIG. 2. In this structure the beams from the display means 1 can be guided efficiently to the eyes 7.

The features of the embodiment of the image display apparatus according to the present invention will be described below. In the present embodiment, there is no separate lens interposed between the eyes 7 and the free surface prism body 2, the apparatus includes the free surface prism body 2 and the relatively large liquid crystal device (in the diagonal size of about one inch or more), the apparatus assures the horizontal angle of view of 50° (the aspect ratio of 4 horizontal: 3 vertical), which is the minimum requirement in the fields of VR (virtual reality) and MR (mixed reality), and it permits attainment of a compact HMD with good optical performance and with capability of formation of the seethrough optical system.

First described are the definitions for generating-line section (meridional section), sagittal section, reference ray, local generating-line section (meridional section), and local sagittal section used in the present invention. In the conventional definitions of optical systems, where the z-axis is taken along the optical axis in each surface vertex coordinate system, the yz section is the conventional generating-line section (meridional section) and the xz section is the conventional sagittal section. In the case of decentered optical systems, however, these definitions are not effective, because there are cases wherein the surface vertex does not exist in an actual surface (i.e., the vertex is off the axis).

Since the present invention adopts the decentered systems, the local generating-line section (meridional section) and local sagittal section for the decentered systems will be defined newly. The local generating-line section (meridional section) is defined as a plane including incident light and emergent light of a reference ray at an intersection, so called a hit point, between each surface and a ray passing the center of the image of the display means 1 (the center of the outside image in the seethrough case) and the center of the eye 7 (this ray will be referred to as a reference ray), and the local sagittal section as a plane being normal to the local generating-line section (meridional section) and parallel to the sagittal section in each surface vertex coordinate system while including the hit point. The features of the present invention will be described below, based on such definitions.

The image display apparatus of the present embodiment has the display means 1 for displaying the image information and the optical means for guiding the light from the display means to the eye 7, the optical means has the prism body 2 of the positive refractive power including three or more surfaces with refractive powers differing depending upon azimuthal angles, the prism surface 3 of the prism body 2 closest to the display means 1 is the surface with refractive powers differing depending upon azimuthal angles, and a local curvature radius area of the prism surface 3 having a positive refractive power on the local generating-line section (meridional section) is placed between local curvature radius areas of the surface 3 having a negative refractive power on the local generating-line section (meridional section).

The image on the liquid crystal display being the display means 1 is enlarged by the free surface prism body 2 of the positive refractive power to be observed by the observer, and it becomes harder to correct for marginal distortion and various aberrations (rotationally symmetric, general aberrations, and decentering aberration) with increase in the angle of view.

In the free surface prism body 2 according to the present invention, therefore, the free curved surface is employed for the surface to which the main power of the prism is allotted (the concave surface 5 of FIG. 1), so as to decrease production of the decentering aberration at the main power surface.

The decentering aberration remaining without being corrected for by the main power surface is corrected for by forming the other surface (the surface 4 of FIG. 1) close to the main power surface in such a surface shape of a free curved surface as to cancel the aberration. Only this design achieves correction for aberration to some extent, but the overall aberration balance is still unsatisfactory.

The total aberration balance is improved by employing the free curved surface for the prism surface (the entrance surface 3 of FIG. 1) near the display means (LCD 1).

Particularly, it becomes harder to make a good total aberration balance with increase in the angle of view. Since rays at respective angles of view does not overlap with each other, as illustrated in FIG. 1, on the entrance surface 3 closest to the display means, the employment of the free curved surface for this surface allows independent aberration correction at each angle of view and facilitates achievement of a good total aberration balance.

Although the prism surface 3 closest to the display means 1 is formed in the surface shape to satisfy the feature of local curvature radii as described above to realize the wide angle of view, the entire system gives rise to little decentering distortion, has a good total aberration balance, and makes it relatively easier to assure the distance between the liquid crystal display or the field lens and the free surface prism body 2 (the distance will be referred to hereinafter as working distance).

Particularly, the marginal areas of the negative refractive power on the local generating-line section (meridional section) function to effect good correction for the decentering distortion, while the area of the positive refractive power near the center on the local generating-line section (meridional section) functions to assure the working distance.

The features of the prism body 2 will be described below. The prism body 2 has the transmitting surface 4, the reflecting surface 5, the reflecting surface 4, and the transmitting surface 3 in the reverse direction to the direction of passage of light, from the surface closest to the eyes 7. The prism body 2 is characterized in that the negative transmitting surface 4, the positive reflecting surface 5, and the negative reflecting surface 4 are arranged in the order named from the eye side, as to the refractive powers on the local sagittal section at the hit point of the reference ray on each prism surface.

In the present invention, the light incident from the display means (liquid crystal display) 1 to the prism body 2 is bent on the local generating-line section (meridional section) by the above two reflecting surfaces (the concave surface 5 and the surface 4 in FIG. 1) and emerges from the transmitting surface 4 of the prism body 2 to be guided to the eyes 7. The thin prism body is attained thanks to this bending of rays. However, since the prism surfaces are decentered on the local generating-line section (meridional section), correction needs to be made more for the decentering aberration than for the general aberrations (rotationally symmetric aberrations). Therefore, it is solved by employing the aforementioned local curvature radius condition.

However, since occurrence of decentering aberration is less on the local sagittal section, another aberration correction is necessary. Thus the general aberrations (rotationally symmetric aberrations) are corrected for well on the local sagittal section near the center of the image of the display means by employing the power arrangement to cancel the aberrations readily, wherein the refractive powers on the local sagittal section at the hit point between each prism surface and the reference ray are arranged in the order of the negative, positive, and negative refractive powers with symmetry from the eye side.

The material of the prism body preferably has the refractive index Nd satisfying the following condition.

$$1.54 < Nd < 1.85 \quad (1)$$

Below the lower limit of Condition (1), it is difficult to assure the sufficient working distance between the LCD 1 or the field lens and the free surface prism body 2. Above the upper limit, the material (glass or plastic material) will be one of special materials and it is thus difficult to produce the free surface prism body.

Let a be an angle between the reference ray and a tangent line to the transmitting surface 4 on the local generating-line section (meridional section) and at the hit point between the reference ray and the transmitting surface 4 of the prism body 2 closest to the eyes 7. Then the angle a preferably satisfies the following condition.

$$70° < \alpha < 95° \quad (2)$$

Condition (2) is the condition for permitting the transmitting surface of the prism body 2 closest to the eye to act as the totally reflecting surface 4 and for defining the tilt decentering amount of the totally reflecting surface 4. Below the lower limit, the prism thickness becomes too large. Particularly, with addition of the seethrough optical system, the optical system will project far into the outside so as to increase the size. Above the upper limit, the surface 4 will be tilted more toward the outside and the tilt decentering amount of the concave surface 5 will also increase, so as to produce large decentering aberration and make it difficult to correct it.

In the free surface prism body 2, the transmitting surface 3, the reflecting surface 4, the reflecting surface 5, and the transmitting surface 4 are arranged in the order named from the surface 3 closest to the display means 1, and the negative transmitting surface, the positive reflecting surface, the positive reflecting surface, and the transmitting surface are arranged in the order named according to the passing order of light from the side of display means 1 as to the refractive powers on the local generating-line section (meridional section) at hit points of a ray passing the center of the eye and a most marginal image on the far side from the eye 7 out of most marginal images on the local generating-line section (meridional section) in the display means 1, on the prism surfaces.

In the present invention the light from the display means (liquid crystal display) 1 travels through the entrance surface 3 of the prism body 2, is totally reflected by the surface 4, is reflected by the concave surface 5, and then travels through the surface 4. In the case of the HMD using such a free surface prism body 2, the position of the lower part (F3) on the local generating-line section (meridional section) in the LCD 1 in FIG. 1 greatly affects the thickness of the HMD.

For the rays emerging from the most marginal image (F3) on the local generating-line section (meridional section) in the LCD 1, when the prism surfaces are provided with the powers as described above, the LCD can be kept from projecting far into the outside, so that the HMD can be made thin.

The rays emerging from the most marginal image (F3) travel via the above entrance surface 3, surface 4, and concave surface 5 and then are incident at an angle below the critical angle to the surface 4 to be transmitted thereby. At this time, the refractive power is positive on the local generating-line section (meridional section) at the hit point where the ray passing the position of the most marginal image F3 of the LCD 1 and the center of the eye 7 is transmitted by the surface 4. This allows sufficient correction for the aberration of the most marginal image (F3).

The transmitting surface 4 closest to the eyes 7 is the surface having the both functions of transmitting action and totally reflecting action.

This surface is the totally reflecting surface 4 and the two functions of the transmitting action and the totally reflecting action are used selectively depending upon the critical angle condition, thereby achieving the bright optical system without fundamental loss of light.

A configuration is as follows for using the image display apparatus of the present invention as a seethrough optical system. The apparatus has the display means 1 for displaying the image information, the optical means 2 for guiding the light from the display means 1 to the eyes 7, and the seethrough optical system for guiding the light from the outside to the eyes 7.

Here the optical means has the prism body 2 of the positive refractive power comprised of three or more different optical surfaces, inclusive of two or more surfaces with refractive powers differing depending upon azimuthal angles (free curved surfaces). The seethrough optical system is constructed in such structure that the separate correction prism 6 is placed adjacent to or joined to the prism body 2 in the optical means, the adjacent surfaces or joint surfaces are made as partially transmitting surfaces, the seethrough optical system has little optical refractive power, and the eye optical axis is approximately aligned with the outside optical axis.

The decentered, curved surface 6b of the seethrough optical system closest to the outside is the surface with refractive powers differing depending upon azimuthal angles, which has the surface shape different from the curved surface 4 of the seethrough optical system closest to the eyes. At this time, the following condition (3) is preferably satisfied by the curvature radius 1_ry on the local generating-line section (meridional section) and the curvature radius 1_rx on the local sagittal section at the hit point of the reference ray on the decentered, curved surface 6b of the seethrough optical system closest to the outside.

$$|1\_rx| < |1\_ry| \quad (3)$$

When the free curved surfaces are adopted for the prism body 2, the focal lengths on the local generating-line section (meridional section) and on the local sagittal section of the free surface prism body cannot be made approximately equal unless there are at least two or more free curved surfaces. Therefore, the prism body is provided with two or more free curved surfaces.

For forming the seethrough optical system, the correction prism 6 as illustrated in FIG. 1 is placed adjacent to or joined to the concave surface 5 of the free surface prism body 2, the concave surface 5 is formed as a half mirror, and the outside surface 6b of the correction prism 6 is designed so as to make the optical refractive power of the seethrough optical system almost null and so as to align the eye optical axis approximately with the outside optical axis.

At this time, the surface 6b is formed in the surface shape different from that of the surface 4 of the seethrough optical system closest to the eyes, in order to suppress occurrence of aberration in the seethrough optical system.

Further, the outside surface 6b of the correction prism 6 is the free curved surface and the curvature on the local generating-line section (meridional section) is set gentler than that on the local sagittal section, thereby decreasing the decentering aberration occurring on the local generating-line section (meridional section) in the seethrough optical system. Similarly, the curved surface 4 of the seethrough optical system closest to the eyes is also the free curved surface, the curvature thereof on the local generating-line section (meridional section) is set gentler than that on the local sagittal section, the aberration of the seethrough optical system is canceled both on the local generating-line section (meridional section) and on the local sagittal section, and the seethrough optical system is designed to have no total refractive power both on the local generating-line section (meridional section) and on the local sagittal section.

The correction prism 6 is placed on the outside of the prism body 2. Thanks to this structure, the display optical system functions well with only the free surface prism body 2 even if the correction prism 6 is taken off. Further, the seethrough optical system can be made up easily by separately preparing the display optical system and adding the correction prism to the outside surface of the display optical system later.

In the prism body 2 of the positive refractive power including the totally reflecting surface having the two functions of transmitting action and totally reflecting action, the totally reflecting surface can be formed in such structure that a reflecting coating is provided in part of the area other than the transmitting area in the totally reflecting surface and a coating gradually decreasing its reflectance with decrease in the distance to the transmitting region is provided in the region between the reflecting coating area (for 100% reflection) and the transmitting area. This structure is described in Japanese Patent Application Laid-Open No. 9-265048.

The reason is that the border is made obscure by the coating with gradually decreasing reflectance, because without the coating the border appears apparent between the reflecting coating area and the transmitting area. However, there is little space between the reflecting coating area and the transmitting area in the structure suggested in Japanese Patent Application Laid-Open No. 9-265048 and it is thus practically impossible to form the coating with the reflectance gradually decreasing toward the transmitting area, in the area between them.

In the present invention, as illustrated in FIG. 1, the reflecting coating is provided in the LCD-side area 9 approximately equal to two thirds of the area other than the transmitting area on the local generating-line section (meridional section) in the total reflecting surface, and the coating with the reflectance gradually decreasing toward the transmitting area is provided in the rest area 10 approximately equal to one third.

This structure allows provision of the coating with the reflectance gradually decreasing. The reflecting coating area 9 and the coating area 10 with gradually decreasing reflectance both are preferably made of a metal mirror of aluminum or the like, because coloring is prevented.

In the present embodiment some rays out of those incident to the reflecting coating area 9 in the totally reflecting surface are incident at angles below the critical angle. The reason is as follows. If all the rays were made incident at angles over the critical angle to the surface 4 of the free surface prism body 2 to be totally reflected for attainment of a wider angle of view without light amount loss, remaining aberration (aberration of persistence of vision) would be large in the upper part of the screen.

In the present invention, therefore, the reflecting coating is provided in the area 9 in the upper part of the surface 4, the light is incident at angles below the critical angle to the reflecting coating to be reflected thereby, and the light is totally reflected in the lower part of the surface 4 as before.

This causes little loss of light, eliminates restrictions on the surface shape in the upper part of the surface 4, increases degrees of design freedom, and decreases the aberration near the upper part of the screen.

The refractive powers on the local generating-line section (meridional section) at the hit points between the prism surfaces and the reference ray are arranged so that the prism surface (entrance surface 3) closest to the LCD 1 has the positive refractive power, the next reflecting surface (totally reflecting surface 4) has the negative refractive power, and the next reflecting surface (concave mirror 5) has the positive refractive power.

This power arrangement works to cancel the decentering aberration occurring at the positive concave mirror 5 by the negative, total reflection surface 4 and to assure the working distance by the positive entrance surface 3. The refractive power is positive on the local generating-line section (meridional section) at the hit point between the reference ray and the transmitting surface (totally reflecting surface) 4 upon emergence from the prism body 2.

The reason is as follows. Among all the prism surfaces, the concave mirror 5 has the strongest positive refractive power and is tilted, thus producing large aberration.

Thus the positive power is allocated to the transmitting part of the surface 4 with relatively small tilt decentering, so as to decrease the load on the concave reflector, thus achieving good optical performance.

The refractive powers were described previously on the local sagittal section at the hit points between the prism surfaces and the reference ray, and the same can also apply to the images in the upper part (F2) and in the lower part (F3) on the local generating-line section (meridional section) of LCD 1. The negative transmitting surface 4, the positive reflecting surface 5, the negative reflecting surface 4, and the transmitting surface 3 are arranged in the order stated from the side of eyes 7, as to the refractive powers on sections parallel to the local sagittal sections at the hit points on each prism surface, of the rays passing the center of the eye and the images of the upper part (F2) and the lower part (F3) on the local generating-line section (meridional section) of LCD 1.

This achieves the power layout capable of readily canceling the aberration with the negative, positive, and negative refractive powers in symmetry from the side of eyes 7, on the sections parallel to the local sagittal sections at the hit points between the prism surfaces and the rays passing the images of the upper part (F2) and the lower part (F3) on the local generating-line section (meridional section) of the display means 1, whereby the general aberrations (rotationally symmetric aberrations) can be corrected for well on the sections parallel to the local sagittal sections near the upper part of the image and near the lower part of the image in the display means 1.

In the present embodiment, letting 1_fx(2–5) be the total focal length of the entire system on the local sagittal section on the reference ray and 1_fx4 be the focal length of the surface 4 on the local sagittal section in the reflection action, they are designed preferably to satisfy the following condition.

$$-1.5 < l\_fx4/l\_fx(2-5) < -0.5 \quad (4)$$

Below the lower limit of Condition (4), the negative power is too weak in the totally reflecting surface on the local sagittal section, and optical paths become long in the prism on the local sagittal section, thus increasing the thickness of the free surface prism body 2.

Over the upper limit, the negative power is too strong in the totally reflecting surface, and the aberration canceling action does not work well in cooperation with the positive power surface of the concave surface 5.

Let F31_fy4 be the focal length on the local generating-line section (meridional section) in reflection of the totally reflecting surface 4 on the ray passing the center of the eye 7 from the image F3 of the display means 1, and F31_fy3 be the focal length on the local generating-line section (meridional section) of the concave surface 5 on the ray passing the center of the eye 7 from the image F3. Then they are designed preferably to satisfy the following condition.

$$0 < F31\_fy3/F31\_fy < 1 \quad (5)$$

Below the lower limit of Condition (5), the power becomes negative on the local generating-line section (meridional section) in reflection of the totally reflecting surface 4 on the center ray of the eye 7 from the image F3, and the part of the image F3 of the LCD 1 will project far more into the outside. Over the upper limit, the positive power is too strong on the local generating-line section (meridional section) in reflection of the totally reflecting surface on the center ray of the eye 7 from the image F3, a negative strong power is required on the local generating-line section (meridional section) in the entrance surface on the center ray of the eye 7 from the image F3, and the sufficient working distance cannot be assured in the part of optical paths from the image F3 of the LCD 1.

The local curvature radius data 1 to 7 (Table 1-3 and Table 2-2 to Table 7-2) in the numerical examples described hereinafter is numeral strings of the local curvature radius ry (the range of y is the outside dimension of the entrance surface in the surface vertex coordinate system) on the local generating-line section (meridional section) (x=0) of the entrance surface (the surface closest to LCD) of the free surface prism body in Embodiments 1 to 7.

The representation method of each element in the embodiments of the image display apparatus of the present invention will be described in detail.

FIG. 2 to FIG. 8 are cross-sectional views (local generating-line sections (meridional sections), indicated by suffix y) to show the main part of Numerical Examples 1 to 7, described hereinafter, of the image display apparatus of the present invention, and the vertex coordinate system of the first surface (eye 7) is presented in FIG. 1.

Figure 9:
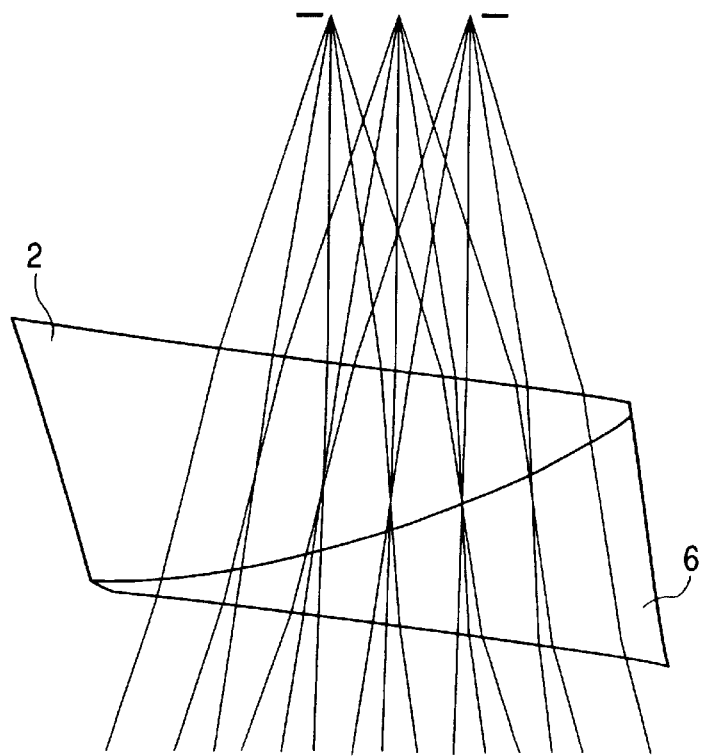
FIG. 9 is a schematic diagram to show the main part of an example in which the image display apparatus of the present invention is applied to a seethrough optical system.

FIG. 9 is a local generating-line sectional view of an example in which the optical system of Numerical Example 4 (FIG. 5) is applied to the seethrough optical system, in which ray tracing is presented in the state of passage in the forward direction from the outside.

In the optical systems of the present invention, the vertex of each surface is decentered only with a shift in the direction of the y-axis and a tilt about the x-axis. Therefore, the general generating-line section (meridional section) and the local generating-line section (meridional section) are the same, but the general sagittal section of each surface is different from the local sagittal section.

The general generating-line section (meridional section) and sagittal section described above are the definitions on the general-paraxial axis, whereas the local generating-line section (meridional section) and local sagittal section are the definitions on the local-paraxial axis described hereinafter.

Further, the definitions will also be given below for the local curvature radius, local surface separation, local focal length, and local refractive power for the decentered systems on the local-paraxial axis.

In the present invention, the reference ray is defined as the center ray emerging from the center of the image of the display means 1 and entering the center of the observation surface (eye 7), and the local curvature radius, local surface separation, local focal length, and local refractive power with respect to the hit point (incident point) of the reference ray to each surface are used instead of the general curvature radius, surface separation, focal length, and refractive power with respect to the vertex of each surface.

Here the local curvature radius means a local curvature radius (a radius of curvature on the local generating-line section (meridional section) or a radius of curvature on the local sagittal section) at the hit point on each optical surface.

The local surface separation is a value of the distance between two hit points on a surface of interest and a next surface thereto (the distance on the reference ray, without reduction to air distance). The local focal length is a value calculated by the conventional focal length calculating method (paraxial tracing) from the local curvature radius, the refractive indexes before and after the surface, and the local surface separation. The local refractive power is a value of the reciprocal of the local focal length.

In each embodiment of the present invention specific numerals are presented for the general curvature radius, surface separation, decentering amount, refractive index, and Abbels number and for the local curvature radius, refractive index of surface, local surface separation, and local focal length.

Seven examples are presented as embodiments of the present invention. The numerical data of Embodiments 1 to 7 is presented in Tables 1 to 7 and the cross-sectional views of optical paths in FIGS. 2 to 8. The numerical data for the seethrough optical system with addition of the correction prism body 6 to the prism body 2 of Embodiment 4 is presented in Table 8 and the cross-sectional view of optical paths thereof in FIG. 9.

In the part of (general-paraxial axis) of Tables 1 to 8, ry represents the generating-line section (meridional section) curvature radius, rx the sagittal section curvature radius, d the surface separation (in parallel to the vertex coordinate system of the first surface),"shift" and"tilt" decentering amounts ("shift" indicating a parallel decentering amount of the surface vertex of each surface with respect to the vertex coordinate system of the first surface and "tilt" a tilt decentering amount, on the generating-line section (meridional section)), and the refractive index for the d-line, vd the Abbe's number, and FFS the free curved surface. Each element with M represents a reflecting surface and the refractive index nd thereof for the d-line is given an opposite sign.

Tables 1 to 7 show the numerical data obtained by reverse tracing from the eye 7 to the liquid crystal side (display means) 1, and Table 8 the numerical data obtained by forward tracing of light from the object toward the pupil (7). The defining equation of FFS (free curved surface) is given as follows.

(In the vertex coordinate system of each surface)

$$z = \frac{(x^2+y^2)/r}{1+\text{SQRT}(1-(1+c1)(x^2+y^2)/r^2)} + c5(x^2-y^2) +$$

$$c6(2x^2+2y^2-1) + c10(3x^2y+3y^3-2y) + c11(3x^2y-y^3) +$$

$$c12(x^4-6x^2y^2+y^4) + c13(4x^4-4y^4-3x^2+3y^2) +$$

$$c14(6x^4+12x^2y^2+6y^4-6x^2-6y^2+1) +$$

$$c20(10yx^4+20x^2y^3+10y^5-12x^2y-12y^3+3y) +$$

$$c21(15yx^4+10x^2y^3-5y^5-12x^2y+4y^3) +$$

$$c22(5yx^4-10x^2y^3+y^5) + c23(x^6-15x^4y^2+15x^2y^4-y^5) +$$

$$c24(6x^6-30x^4y^2-30x^2y^4+6y^6-5x^4+30x^2y^2-5y^4) +$$

$$c25(15x^6+15x^4y^2-15x^2y^4-15y^6-20x^4+20y^4+6x^2 -$$

$$6y^2) + c26(20x^6+60x^4y^2+60x^2y^4+20y^6-30x^4 -$$

$$60x^2y^2-30y^4+12x^2+12y^2-1)$$

Each of c1, c5, ... is a free surface coefficient.

(Note: In the case of the free curved surfaces in the embodiments, since there are coefficients associated with the paraxial axis among the free surface coefficients, the values of the generating-line section (meridional section) curvature radius ry and sagittal section curvature radius rx on the general-paraxial axis do not agree with actual generating-line section (meridional section) curvature radius ry and sagittal section curvature radius rx on the vertex of surface. Thus the tables also include the actual generating-line section (meridional section) curvature radius ry and sagittal section curvature radius rx at the point (0, 0), i.e., on the surface vertex.) In the part of (local-paraxial axis), the tables include the local curvature radii local_ry, local_rx, the local surface separation local_d (with a reverse sign for a reflecting surface), the local focal lengths local_fy, local_fx, and the refractive index nd of surface (with a reverse sign for a reflecting surface).

The tables also include the hit point coordinates on each surface (with the vertex at 0, 0), the overall local focal lengths, and the angles of view.

Further, below the part of (local-paraxial axis), numerical data is added as local paraxial ray<F2>, including the local curvature radii local ry, local_rx, local surface separation local_d (with a reverse sign for a reflecting surface), local focal lengths local_fy, local_fx, refractive index nd of surface (with a reverse sign for a reflecting surface), hit point coordinates on each surface (with the vertex at 0, 0), and overall local focal lengths, at the hit point between each surface and the ray passing the center of the eye and the most marginal image F2 (upper part) of the LCD on the local generating-line section (meridional section) of the LCD, different from the hit point between the reference ray and each surface.

The numerical data and calculated values in this case were computed by replacing the reference ray of the local-paraxial axis (the ray passing the center of the eye and the center of the LCD) with the ray passing the center of the eye and the most marginal image F2 (upper part) of the LCD. The data is also added similarly as local paraxial ray<F3> for the most marginal image F3 (lower part) of the LCD.

Table 9 includes lists of the following data for seven Embodiments 1 to 7: the local generating-line section (meridional section) focal length and local sagittal section focal length (on the reference ray) of each surface and the entire system; the local generating-line section (meridional section) focal length and local sagittal section focal length of each surface and the entire system on the ray from F2 to the center of the eye; the local generating-line section (meridional section) focal length and local sagittal section focal length of each surface and the entire system on the ray from F3 to the center of the eye.

The numerical examples of the embodiments of the present invention are listed below.

TABLE 1-1

(general - paraxial axis)

| | n | ry | rx | d | shift | tilt | nd | vd |
|---|---|---|---|---|---|---|---|---|
| | 1 | 0.00000 | 0.00000 | 22.963 | 0.000 | 0.000 | 1.000 | |
| FFS | 2 | −480.08713 | −480.08713 | 10.189 | −11.599 | 7.838 | 1.571 | 33.80 |
| FFS-M | 3 | −0.22713 | −0.22713 | −10.189 | 0.822 | −21.391 | −1.571 | 33.80 |
| FFS-M | 4 | −480.08713 | −480.08713 | 4.909 | −11.599 | 7.838 | 1.571 | 33.80 |
| FFS | 5 | −35.54844 | −35.54844 | −3.366 | 23.627 | 57.371 | 1.000 | |
| FFS | 6 | 38.93600 | 38.93600 | 1.487 | 30.461 | 29.400 | 1.571 | 33.80 |
| | 7 | 0.00000 | 0.00000 | 0.348 | 31.299 | 45.938 | 1.000 | |
| | 8 | 0.00000 | 0.00000 | 0.556 | 31.658 | 45.938 | 1.492 | 57.40 |
| | 9 | 0.00000 | 0.00000 | 0.278 | 32.233 | 45.938 | 1.000 | |
| | 10 | 0.00000 | 0.00000 | 0.556 | 32.520 | 45.938 | 1.523 | 58.60 |
| | 11 | 0.00000 | 0.00000 | 0.000 | 33.095 | 45.938 | 1.000 | |
| | 12 | 0.00000 | 0.00000 | 0.000 | 33.095 | 45.938 | 1.000 | |

| FFS | 2 | c1 = 8.8419e+01 | c5 = −2.5168e−03 | c6 = 8.9928e−04 | c10 = −2.0227e−05 | c11 = −2.7364e−05 |
|---|---|---|---|---|---|---|
| | | c12 = 3.1057e−07 | c13 = 4.8362e−08 | c14 = −2.8140e−08 | c20 = −9.4303e−11 | c21 = 5.1779e−10 |
| | | c22 = 1.0446e−09 | | | | |
| FFS | 3 | c1 = −1.1377e+18 | c5 = −1.6753e−03 | c6 = −3.6429e−03 | c10 = −1.5126e−05 | c11 = −4.8975e−06 |
| | | c12 = −2.2406e−08 | c13 = −1.1729e−07 | c14 = 3.1752e−09 | c20 = −3.9915e−09 | c21 = 1.7127e−09 |
| | | c22 = 4.9507e−10 | | | | |
| FFS | 4 | c1 = 8.8419e+01 | c5 = −2.5168e−03 | c6 = 8.9928e−04 | c10 = −2.0227e−05 | c11 = −2.7364e−05 |
| | | c12 = 3.1057e−07 | c13 = 4.8362e−08 | c14 = −2.8140e−08 | c20 = −9.4303e−11 | c21 = 5.1779e−10 |
| | | c22 = 1.0446e−09 | | | | |
| FFS | 5 | c1 = 0.0000e+00 | c5 = −4.0879e−04 | c6 = −1.7459e−03 | c10 = 1.6776e−04 | c11 = −6.6524e−05 |
| | | c12 = 1.5221e−05 | c13 = −1.8579e−05 | c14 = 1.3333e−05 | c20 = −2.1282e−07 | c21 = −7.6310e−08 |
| | | c22 = 1.8050e−07 | | | | |
| FFS | 6 | c1 = 0.0000e+00 | c5 = −5.0169e−02 | c6 = 1.7147e−02 | c10 = 2.5255e−03 | c11 = −2.3624e−03 |
| | | c12 = 7.4686e−05 | c13 = −4.0808e−05 | c14 = 1.8139e−05 | c20 = −7.2790e−08 | c21 = −4.8099e−07 |
| | | c22 = 6.0425e−07 | | | | |

TABLE 1-1-continued

| | n | point ( y , x ) | ry | rx |
|---|---|---|---|---|
| | 2 | ( 0.000, 0.000 ) | 152.711 | −284.149 |
| | 3 | ( 0.000, 0.000 ) | −89.110 | −55.797 |
| | 4 | ( 0.000, 0.000 ) | 152.711 | −284.149 |
| | 5 | ( 0.000, 0.000 ) | −28.928 | −27.793 |
| | 6 | ( 0.000, 0.000 ) | 5.151 | −165.588 |
| | 7 | ( 0.000, 0.000 ) | 0.000 | 0.000 |

(local - paraxial axis)

| | n | local-ry | local-rx | local-fy | local-fx | local-d | nd |
|---|---|---|---|---|---|---|---|
| FFS | 2 | 259.24098 | −132.88533 | 454.092 | −232.765 | 11.198 | 1.571 |
| FFS-M | 3 | −90.21012 | −56.00614 | 28.713 | 17.826 | −16.873 | −1.571 |
| FFS-M | 4 | −4856.13590 | −75.04028 | −1545.654 | −23.884 | 13.293 | 1.571 |
| FFS | 5 | −29.79404 | −27.32328 | 52.188 | 47.860 | 2.389 | 1.000 |
| FFS | 6 | −29.81369 | −31.32882 | −52.222 | −54.876 | 1.511 | 1.571 |
| | 7 | 0.00000 | 0.00000 | 0.000 | 0.000 | 0.000 | 1.000 |

| n | highpoint( y, x) |
|---|---|
| 2 | ( 11.655, 0.000 ) |
| 3 | ( −0.552, 0.000 ) |
| 4 | ( 23.890, 0.000 ) |
| 5 | ( −1.871, 0.000 ) |
| 6 | ( −8.470, 0.000 ) |
| 7 | ( −8.328, 0.000 ) |

| local_fy(2-7) | local_fx(2-7) | 2Wy | 2Wx |
|---|---|---|---|
| 26.311 | 27.379 | 38.55 | 50.00 |

| local_fy(2-5) | local_fx(2-5) |
|---|---|
| 24.039 | 26.406 |

| local_fy(607) | local_fx(6-7) |
|---|---|
| −52.222 | −54.876 |

TABLE 1-2 local paraxial ray <F2>

| | n | local-ry | local-rx | local-fy | local-fx | local-d | nd |
|---|---|---|---|---|---|---|---|
| FFS | 2 | 622.11331 | −92.24037 | 1089.706 | −161.570 | 15.545 | 1.571 |
| FFS-M | 3 | −71.59795 | −51.72954 | 22.789 | 16.465 | −21.417 | −1.571 |
| FFS-M | 4 | −121.34141 | −46.45193 | −38.622 | −14.785 | 2.708 | 1.571 |
| FFS | 5 | 13.26889 | −33.10398 | −23.242 | 57.986 | 4.198 | 1.000 |
| FFS | 6 | 5.28580 | −163.31643 | 9.259 | −286.068 | 1.677 | 1.571 |
| | 7 | 0.00000 | 0.00000 | 0.000 | 0.000 | 0.000 | 1.000 |

| n | hitpoint( y ,x ) |
|---|---|
| 2 | ( 19.094, 0.000 ) |
| 3 | ( 10.690, 0.000 ) |
| 4 | ( 36.648, 0.000 ) |
| 5 | ( 6.961, 0.000 ) |
| 6 | ( −0.082, 0.000 ) |
| 7 | ( 0.329, 0.000 ) |

| local_fy(2-7) | local_fx(2-7) |
|---|---|
| 21.562 | 22.950 |

| local_fy(2-5) | local_fx(2-5) |
|---|---|
| 49.068 | 22.924 |

| local_fy(6-7) | local_fx(6-7) |
|---|---|
| 9.259 | −286.068 |

TABLE 1-2-continued local paraxial ray <F3>

|  | n | local-ry | local-rx | local-fy | local-fx | local-d | nd |
|---|---|---|---|---|---|---|---|
| FFS | 2 | 173.52055 | −214.48582 | 303.942 | −375.698 | 6.314 | 1.571 |
| FFS-M | 3 | −148.81449 | −60.84823 | 47.366 | 19.367 | −9.549 | −1.571 |
| FFS-M | 4 | 225.74639 | −150.11913 | 71.853 | −47.781 | 24.561 | 1.571 |
| FFS | 5 | 6.43706 | −68.03461 | −11.275 | 119.171 | 1.013 | 1.000 |
| FFS | 6 | 9.68541 | −29.10767 | 16.965 | −50.986 | 1.589 | 1.571 |
|  | 7 | 0.00000 | 0.00000 | 0.000 | 0.000 | 0.000 | 1.000 |

| n | hitpoint( y, x ) |
|---|---|
| 2 | ( 3.762, 0.000 ) |
| 3 | ( −10.684, 0.000 ) |
| 4 | ( 9.454, 0.000 ) |
| 5 | ( −10.201, 0.000 ) |
| 6 | ( −16.565, 0.000 ) |
| 7 | ( −16.734, 0.000 ) |

| local_fy(2-7) | local_fx(2-7) |
|---|---|
| 37.275 | 29.844 |

| local_fy(2-5) | local_fx(2-5) |
|---|---|
| 91.170 | 27.718 |

| local_fy(6-7) | local_fx(6-7) |
|---|---|
| 16.965 | −50.986 |

TABLE 1-3

[Data 1] local radius of curvature (Embodiment 1)

| y-coordinate* | $r_y$ |
|---|---|
| −10.8000 | 6.0545 |
| −10.1448 | 6.4928 |
| −9.4897 | 7.4121 |
| −8.8345 | 8.9376 |
| −8.1793 | 11.3362 |
| −7.5241 | 15.1754 |
| −6.8690 | 21.8090 |
| −6.2138 | 35.3053 |
| −5.5586 | 75.5927 |
| −4.9034 | 2640.4483 |
| −4.2483 | −96.1156 |
| −3.5931 | −51.9638 |
| −2.9379 | −38.1595 |
| −2.2828 | −31.9407 |
| −1.6276 | −28.9458 |
| −0.9724 | −27.8384 |
| −0.3172 | −28.2099 |
| 0.3379 | −30.1439 |
| 0.9931 | −34.2806 |

TABLE 1-3-continued

[Data 1] local radius of curvature (Embodiment 1)

| y-coordinate* | $r_y$ |
|---|---|
| 1.6483 | −42.5034 |
| 2.3034 | −61.2320 |
| 2.9586 | −130.6671 |
| 3.6138 | 405.7016 |
| 4.2690 | 71.3859 |
| 4.9241 | 37.0705 |
| 5.5793 | 24.1911 |
| 6.2345 | 17.5539 |
| 6.8897 | 13.5988 |
| 7.5448 | 11.0643 |
| 8.2000 | 9.3991 |

*x-coordinate = 0

TABLE 2-1

(general - paraxial axis)

|  | n | ry | rx | d | shift | tilt | nd | vd |
|---|---|---|---|---|---|---|---|---|
|  | 1 | 0.00000 | 0.00000 | 24.632 | 0.000 | 0.000 | 1.000 |  |
| FFS | 2 | −587.16080 | −587.16080 | 10.129 | −12.226 | 10.084 | 1.571 | 33.80 |
| FFS-M | 3 | −0.22715 | −0.22715 | −10.129 | 1.832 | −18.640 | −1.571 | 33.80 |
| FFS-M | 4 | −587.16080 | −587.16080 | 5.549 | −12.226 | 10.084 | 1.571 | 33.80 |
| FFS | 5 | −21.46025 | −21.46025 | 3.809 | 22.160 | 59.572 | 1.000 |  |
|  | 6 | 0.00000 | 0.00000 | 0.539 | 23.196 | 47.683 | 1.492 | 57.40 |
|  | 7 | 0.00000 | 0.00000 | 0.269 | 23.788 | 47.683 | 1.000 |  |
|  | 8 | 0.00000 | 0.00000 | 0.539 | 24.083 | 47.683 | 1.523 | 58.60 |

TABLE 2-1-continued

|   |   |         |         |       |        |        |       |
|---|---|---------|---------|-------|--------|--------|-------|
|   | 9 | 0.00000 | 0.00000 | 0.000 | 24.675 | 47.683 | 1.000 |
|   | 10| 0.00000 | 0.00000 | 0.000 | 24.675 | 47.683 | 1.000 |

| | | | | | | |
|---|---|---|---|---|---|---|
| FFS | 2 | $c1 = 1.9682e+02$ | $c5 = -3.0230e-03$ | $c6 = 6.9007e-04$ | $c10 = -1.2658e-05$ | $c11 = -1.5828e-05$ |
|  |  | $c12 = -4.1337e-08$ | $c13 = 2.9268e-07$ | $c14 = -1.4940e-07$ | $c20 = 1.9859e-09$ | $c21 = -3.5891e-09$ |
|  |  | $c22 = 1.9207e-09$ |  |  |  |  |
| FFS | 3 | $c1 = -1.2714e+13$ | $c5 = -1.4314e-03$ | $c6 = -3.7341e-03$ | $c10 = -7.0617e-06$ | $c11 = -5.2946e-06$ |
|  |  | $c12 = 6.8097e-08$ | $c13 = -1.4275e-07$ | $c14 = -3.7784e-08$ | $c20 = -6.1256e-09$ | $c21 = 4.2700e-09$ |
|  |  | $c22 = -2.0844e-09$ |  |  |  |  |
| FFS | 4 | $c1 = 1.9682e+02$ | $c5 = -3.0230e-03$ | $c6 = 6.9007e-04$ | $c10 = -1.2658e-05$ | $c11 = -1.5828e-05$ |
|  |  | $c12 = -4.1337e-08$ | $c13 = 2.9268e-07$ | $c14 = -1.4940e-07$ | $c20 = 1.9859e-09$ | $c21 = -3.5891e-09$ |
|  |  | $c22 = 1.9207e-09$ |  |  |  |  |
| FFS | 5 | $c1 = 0.0000e+00$ | $c5 = -1.3332e-03$ | $c6 = 7.5501e-03$ | $c10 = -1.0517e-04$ | $c11 = -1.4215e-04$ |
|  |  | $c12 = 8.6299e-06$ | $c13 = -1.2595e-05$ | $c11 = 9.8915e-06$ | $c20 = -2.6060e-07$ | $c21 = 2.9796e-07$ |
|  |  | $c22 = -1.5912e-07$ |  |  |  |  |

| n | point ( y, x ) | ry | rx |
|---|---|---|---|
| 2 | ( 0.000, 0.000 ) | 140.710 | -200.446 |
| 3 | ( 0.000, 0.000 ) | -82.181 | -55.893 |
| 4 | ( 0.000, 0.000 ) | 140.710 | -200.446 |
| 5 | ( 0.000, 0.000 ) | -71.812 | -52.337 |

(local - paraxial axis)

|  | n | local-ry | local-rx | local-fy | local-fx | local-d | nd |
|---|---|---|---|---|---|---|---|
| FFS | 2 | 352.44890 | -129.79469 | 617.356 | -227.351 | 11.374 | 1.571 |
| FFS-M | 3 | -83.92642 | -56.51741 | 26.713 | 17.989 | -16.806 | -1.571 |
| FFS-M | 4 | -932.11673 | -85.72194 | -296.682 | -27.284 | 13.446 | 1.571 |
| FFS | 5 | -70.82508 | -50.34218 | 124.059 | 88.180 | 0.000 | 1.000 |

| n | hitpoint ( y, x ) |
|---|---|
| 2 | ( 12.336, 0.000 ) |
| 3 | ( -1.452, 0.000 ) |
| 4 | ( 23.982, 0.000 ) |
| 5 | ( 0.525, 0.000 ) |

| local_fy(2-5) | local_fx(2-5) | 2Wy | 2Wx |
|---|---|---|---|
| 25.785 | 26.525 | 38.55 | 50.00 | local paraxial ray <E2>

|  | n | local-ry | local-rx | local-fy | local-fx | local-d | nd |
|---|---|---|---|---|---|---|---|
| FFS | 2 | -6170.96770 | -98.43391 | -10809.189 | -172.419 | 15.770 | 1.571 |
| FFS-M | 3 | -71.76443 | -53.05490 | 22.842 | 16.887 | -21.411 | -1.571 |
| FFS-M | 4 | -138.44829 | -52.69961 | -44.067 | -16.774 | 2.810 | 1.571 |
| FFS | 5 | 71.95832 | -36.35033 | -126.044 | 63.672 | 0.000 | 1.000 |

| n | hitpoint( y, x ) |
|---|---|
| 2 | ( 20.093, 0.000 ) |
| 3 | ( 10.133, 0.000 ) |
| 4 | ( 36.889, 0.000 ) |
| 5 | ( 9.351, 0.000 ) |

| local_fy(2-5) | local_fx(2-5) |
|---|---|
| 31.431 | 23.090 | local paraxial ray <F3>

|  | n | local-ry | local-rx | local-fy | local-fx | local-d | nd |
|---|---|---|---|---|---|---|---|
| FFS | 2 | 160.60815 | -175.18906 | 281.324 | -306.865 | 6.202 | 1.571 |
| FFS-M | 3 | -141.47858 | -59.00363 | 45.031 | 18.780 | -9.397 | -1.571 |
| FFS-M | 4 | 242.52048 | -144.12931 | 77.192 | -45.875 | 25.345 | 1.571 |
| FFS | 5 | 9.35611 | -543.78317 | -16.388 | 952.501 | 0.000 | 1.000 |

| n | hitpoint( y, x ) |
|---|---|
| 2 | ( 3.883, 0.000 ) |
| 3 | ( -12.060, 0.000 ) |
| 4 | ( 9.399, 0.000 ) |
| 5 | ( -7.925, 0.000 ) |

TABLE 2-1-continued

| local_fy(2-5) | local_fx(2-5) |
|---|---|
| 47.471 | 28.287 |

TABLE 2-2

[Data 2] local radius of curvature (Embodiment 2)

| y-coordinate* | $r_y$ |
|---|---|
| −8.5000 | 8.2653 |
| −7.8379 | 9.5635 |
| −7.1759 | 11.5712 |
| −6.5138 | 14.6082 |
| −5.8517 | 19.2993 |
| −5.1897 | 26.9807 |
| −4.5276 | 41.0086 |
| −3.8655 | 72.6565 |
| −3.2034 | 196.4509 |
| −2.5414 | −563.7437 |
| −1.8793 | −143.3790 |
| −1.2172 | −93.8553 |
| −0.5552 | −77.1870 |
| 0.1069 | −71.3304 |
| 0.7690 | −71.4717 |
| 1.4310 | −76.7903 |
| 2.0931 | −88.7630 |
| 2.7552 | −112.6330 |
| 3.4172 | −166.1843 |
| 4.0793 | −351.9570 |
| 4.7414 | 2036.9977 |
| 5.4034 | 261.9383 |
| 6.0655 | 143.4009 |
| 6.7276 | 102.1839 |
| 7.3897 | 82.8088 |
| 8.0517 | 73.2441 |
| 8.7138 | 69.8471 |
| 9.3759 | 72.1695 |
| 10.0379 | 83.0220 |
| 10.7000 | 115.7703 |

*x-coordinate = 0

TABLE 3-1

(general - paraxial axis)

| | n | ry | rx | d | shift | tilt | nd | vd |
|---|---|---|---|---|---|---|---|---|
| | 1 | 0.00000 | 0.00000 | 24.840 | 0.000 | 0.000 | 1.000 | |
| FFS | 2 | −662.03558 | −662.03558 | 9.775 | −4.558 | 6.359 | 1.571 | 33.80 |
| FFS-M | 3 | −0.22716 | −0.22716 | −9.775 | −1.375 | −20.930 | −1.571 | 33.80 |
| FFS-M | 4 | −662.03558 | −662.03558 | 11.641 | −4.558 | 6.359 | 1.571 | 33.80 |
| FFS | 5 | −28.59571 | −28.59571 | 1.589 | 18.724 | 62.175 | 1.000 | |
| | 6 | 0.00000 | 0.00000 | 0.549 | 19.956 | 46.679 | 1.492 | 57.40 |
| | 7 | 0.00000 | 0.00000 | 0.274 | 20.538 | 46.679 | 1.000 | |
| | 8 | 0.00000 | 0.00000 | 0.549 | 20.829 | 46.679 | 1.523 | 58.60 |
| | 9 | 0.00000 | 0.00000 | 0.000 | 21.111 | 46.679 | 1.000 | |
| | 10 | 0.00000 | 0.00000 | 0.000 | 21.111 | 46.679 | 1.000 | |

| | | | | | | |
|---|---|---|---|---|---|---|
| FFS | 2 | c1 = 3.2961e+02 | c5 = −3.4276e−03 | c6 = −8.6600e−04 | c10 = 1.8960e−05 | c11 = 6.7468e−05 |
| | | c12 = −1.8067e−07 | c13 = −3.6724e−07 | c14 = −9.5009e−07 | c20 = 2.8069e−09 | c21 = −5.0198e−09 |
| | | c22 = 3.1529e−08 | | | | |
| FFS | 3 | c1 = −1.2714e+13 | c5 = −1.1848e−03 | c6 = −3.9987e−03 | c10 = −5.6578e−06 | c11 = 1.4716e−05 |
| | | c12 = 7.6558e−07 | c13 = −5.0743e−07 | c14 = −1.3640e−07 | c20 = 5.8282e−09 | c21 = 7.9367e−09 |
| | | c22 = −4.1052e−09 | | | | |
| FFS | 4 | c1 = 3.2961e+02 | c5 = −3.4276e−03 | c6 = −8.6600e−01 | c10 = 1.8960e−0.5 | c11 = 6.7468e−05 |
| | | c12 = −1.8067e−07 | c13 = −3.6724e−07 | c14 = −9.5009e−07 | c20 = 2.8069e−09 | c21 = −5.0198e−09 |
| | | c22 = 3.1529e−08 | | | | |
| FFS | 5 | c1 = 0.0000e+00 | c5 = 4.6026e−03 | c6 = 1.2712e−02 | c10 = −6.8128e−04 | c11 = 6.8718e−04 |
| | | c12 = 2.9180e−05 | c13 = −6.0746e−05 | c14 = 2.3260e−05 | c20 = −1.8640e−06 | c21 = 1.4982e−06 |
| | | c22 = 1.1056e−07 | | | | |

| n | point ( y, x ) | ry | rx |
|---|---|---|---|
| 2 | ( 0.000, 0.000 ) | 529.122 | −84.630 |
| 3 | ( 0.000, 0.000 ) | −72.887 | −54.191 |
| 4 | ( 0.000, 0.000 ) | 529.122 | −84.630 |
| 5 | ( 0.000, 0.000 ) | 165.857 | 39.733 |

TABLE 3-1-continued (local - paraxial axis)

|  | n | local-ry | local-rx | local-fy | local-fx | local-d | nd |
|---|---|---|---|---|---|---|---|
| FFS | 2 | 1605.10899 | −100.64966 | 2811.541 | −176.300 | 10.936 | 1.571 |
| FFS-M | 3 | −72.00443 | −54.64816 | 22.918 | 17.394 | −16.121 | −1.571 |
| FFS-M | 4 | −224.72035 | −99.58531 | −71.526 | −31.697 | 12.993 | 1.571 |
| FFS | 5 | −4445.09299 | 42.27033 | 7786.113 | −74.042 | 0.000 | 1.000 |

| n | hitpoint( y, x ) |
|---|---|
| 2 | ( 4.584, 0.000 ) |
| 3 | ( 1.910, 0.000 ) |
| 4 | ( 15.652, 0.000 ) |
| 5 | ( 6.769, 0.000 ) |

| local_fy(2-5) | local_fx(2-5) | 2Wy | 2Wx |
|---|---|---|---|
| 27.577 | 27.322 | 36.12 | 47.00 | local paraxial ray <F2>

|  | n | local-ry | local-rx | local-fy | local-fx | local-d | nd |
|---|---|---|---|---|---|---|---|
| FFS | 2 | −292.64788 | −107.17305 | −512.608 | −187.726 | 15.105 | 1.571 |
| FFS-M | 3 | −75.29623 | −52.40374 | 23.966 | 16.680 | −20.625 | −1.571 |
| FFS-M | 4 | 117.12566 | −66.40567 | 37.280 | −21.136 | 3.106 | 1.571 |
| FFS | 5 | 9.88601 | 93.05756 | −17.317 | −163.001 | 0.000 | 1.000 |

| n | hitpoint( y, x ) |
|---|---|
| 2 | ( 12.300, 0.000 ) |
| 3 | ( 13.108, 0.000 ) |
| 4 | ( 27.940, 0.000 ) |
| 5 | ( 14.878, 0.000 ) |

| local_fy(2-5) | local_fx(2-5) |
|---|---|
| 31.604 | 23.511 | local paraxial ray <F3>

|  | n | local-ry | local-rx | local-fy | local-fx | local-d | nd |
|---|---|---|---|---|---|---|---|
| FFS | 2 | 772.52973 | −71.45917 | 1353.178 | −125.169 | 5.957 | 1.571 |
| FFS-M | 3 | −93.07286 | −49.82337 | 29.624 | 15.858 | −9.248 | −1.571 |
| FFS-M | 4 | 639.62731 | −91.92709 | 203.586 | −29.259 | 24.472 | 1.571 |
| FFS | 5 | 23.50312 | 38.95052 | −41.169 | −68.227 | 0.000 | 1.000 |

| n | hitpoint( y, x ) |
|---|---|
| 2 | ( −3.705, 0.000 ) |
| 3 | ( −8.195, 0.000 ) |
| 4 | ( 1.977, 0.000 ) |
| 5 | ( −1.484, 0.000 ) |

| local_fy(2-5) | local_fx(2-5) |
|---|---|
| 29.855 | 32.641 |

TABLE 3-2

[Data 3] local radius of curvature
(Embodiment 3)

| y-coordinate* | $r_y$ |
|---|---|
| −2.1000 | 15.0761 |
| −1.4655 | 23.8577 |
| −0.8310 | 43.1591 |
| −0.1966 | 106.2869 |
| 0.4379 | −5e+03 |
| 1.0724 | −156.7213 |
| 1.7069 | −101.0910 |
| 2.3414 | −88.1684 |

TABLE 3-2-continued

[Data 3] local radius of curvature
(Embodiment 3)

| y-coordinate* | $r_y$ |
|---|---|
| 2.9759 | −88.6561 |
| 3.6103 | −98.2514 |
| 4.2448 | −118.5824 |
| 4.8793 | −157.1873 |
| 5.5138 | −237.9154 |
| 6.1483 | −472.3452 |
| 6.7828 | 5377.5511 |
| 7.4172 | 630.8863 |

TABLE 3-2-continued

[Data 3] local radius of curvature (Embodiment 3)

| y-coordinate* | $r_y$ |
|---|---|
| 8.0517 | 306.0244 |
| 8.6862 | 199.5802 |
| 9.3207 | 142.0666 |
| 9.9552 | 103.5677 |
| 10.5897 | 75.5310 |
| 11.2241 | 54.8060 |
| 11.8586 | 39.6808 |
| 12.4931 | 28.8300 |
| 13.1276 | 21.1426 |
| 13.7621 | 15.7363 |
| 14.3966 | 11.9562 |
| 15.0310 | 9.3419 |
| 15.6655 | 7.5846 |
| 16.3000 | 6.4898 |

*x-coordinate = 0

TABLE 4-1

(general - paraxial axis)

|  | n | ry | rx | d | shift | tilt | nd | vd |
|---|---|---|---|---|---|---|---|---|
|  | 1 | 0.00000 | 0.00000 | 24.840 | 0.000 | 0.000 | 1.000 |  |
| FFS | 2 | −662.03558 | −662.03558 | 9.775 | −4.558 | 6.359 | 1.571 | 33.80 |
| FFS-M | 3 | −0.22716 | −0.22716 | −9.775 | −1.375 | −20.930 | −1.571 | 33.80 |
| FFS-M | 4 | −662.03558 | −662.03558 | 11.641 | −4.558 | 6.359 | 1.571 | 33.80 |
| FFS | 5 | −28.59571 | −28.59571 | 1.589 | 18.721 | 62.175 | 1.000 |  |
|  | 6 | 0.00000 | 0.00000 | 0.549 | 19.956 | 46.679 | 1.492 | 57.40 |
|  | 7 | 0.00000 | 0.00000 | 0.274 | 20.538 | 46.679 | 1.000 |  |
|  | 8 | 0.00000 | 0.00000 | 0.549 | 20.829 | 46.679 | 1.523 | 58.60 |
|  | 9 | 0.00000 | 0.00000 | 0.000 | 21.411 | 46.679 | 1.000 |  |
|  | 10 | 0.00000 | 0.00000 | 0.000 | 21.411 | 46.679 | 1.000 |  |

| | n | | | | | |
|---|---|---|---|---|---|---|
| FFS | 2 | c1 = 3.2961e+02 | c5 = −2.5107e−03 | c6 = −4.5579e−04 | c10 = −4.4834e−06 | c11 = 7.6751e−06 |
|  |  | c12 = 6.1053e−07 | c13 = −1.4681e−08 | c14 = −9.4057e−08 | c20 = −7.2362e−09 | c21 = 7.9987e−10 |
|  |  | c22 = −3.7631e−09 | c23 = −4.7877e−11 | c24 = −1.6833e−11 | c25 = −7.9375e−11 | c26 = 4.5408e−11 |
| FFS | 3 | c1 = −1.2714e+13 | c5 = −1.2936e−03 | c6 = −3.8853e−03 | c10 = −7.6989e−06 | c11 = 5.7988e−06 |
|  |  | c12 = 2.8169e−07 | c13 = −2.3948e−07 | c14 = −3.4805e−08 | c20 = 7.4620e−11 | c21 = 6.9342e−10 |
|  |  | c22 = −6.2799e−09 | c23 = −3.9722e−11 | c24 = −3.5429e−12 | c25 = 7.3572e−11 | c26 = −3.0433e−11 |
| FFS | 4 | c1 = 3.2961e+02 | c5 = −2.5107e−03 | c6 = −4.5579e−04 | c10 = −4.4834e−06 | c11 = 7.6751e−06 |
|  |  | c12 = 6.1053e−07 | c13 = −1.4681e−08 | c14 = −9.4057e−08 | c20 = −7.2362e−09 | c21 = 7.9987e−10 |
|  |  | c22 = −3.7631e−09 | c23 = −4.7877e−11 | c24 = −1.6833e−11 | c25 = −7.9375e−11 | c26 = 4.5408e−11 |
| FFS | 5 | c1 = 0.0000e+00 | c5 = −1.3339e−02 | c6 = 1.7778e−02 | c10 = −1.2618e−03 | c22 = 5.6605e−04 |
|  |  | c12 = 1.9848e−06 | c13 = −2.1787e−05 | c14 = 6.9323e−06 | c20 = 3.2212e−07 | c21 = 1.9884e−07 |
|  |  | c22 = 3.3874e−07 | c23 = 4.4258e−09 | c24 = 1.7429e−09 | c25 = 8.0957e−10 | c26 = −3.3367e−09 |

| n | point ( y, x ) | ry | rx |
|---|---|---|---|
| 2 | ( 0.000, 0.000 ) | 592.175 | −119.707 |
| 3 | ( 0.000, 0.000 ) | −76.637 | −54.885 |
| 4 | ( 0.000, 0.000 ) | 592.175 | −119.707 |
| 5 | ( 0.000, 0.000 ) | 15.973 | 105.125 |

(local - paraxial axis)

|  | n | local-ry | local-rx | local-fy | local-fx | local-d | nd |
|---|---|---|---|---|---|---|---|
| FFS | 2 | 1028.94704 | −117.71993 | 1802.324 | −206.201 | 10.939 | 1.571 |
| FFS-M | 3 | −75.58225 | −55.05737 | 24.057 | 17.524 | −16.068 | −1.571 |
| FFS-M | 4 | −334.94943 | −91.94954 | −106.611 | −29.267 | 13.542 | 1.571 |
| FFS | 5 | −30.42235 | −98.90753 | 53.288 | 173.248 | 0.000 | 1.000 |

| n | hitpoint( y, x ) |
|---|---|
| 2 | ( 4.584, 0.000 ) |
| 3 | ( 1.911, 0.000 ) |
| 4 | ( 15.641, 0.000 ) |
| 5 | ( 6.268, 0.000 ) |

TABLE 4-1-continued

| | local_fy(2-5) | local_fx(2-5) | 2Wy | 2wx |
|---|---|---|---|---|
| | 24.181 | 25.884 | 36.12 | 47.00 | local paraxial ray <F2>

| | n | local-ry | local-rx | local-fy | local-fx | local-d | nd |
|---|---|---|---|---|---|---|---|
| FFS | 2 | −641.44156 | −101.39650 | −1123.562 | −177.608 | 15.090 | 1.571 |
| FFS-M | 3 | −69.98928 | −52.97438 | 22.277 | 16.861 | −20.399 | −1.571 |
| FFS-M | 4 | −359.89748 | −63.04020 | −114.551 | −20.065 | 3.049 | 1.571 |
| FFS | 5 | 16.75887 | −74.84390 | −29.355 | 131.098 | 0.000 | 1.000 |

| n | hitpoint( y, x ) |
|---|---|
| 2 | ( 12.305, 0.000 ) |
| 3 | ( 13.073, 0.000 ) |
| 4 | ( 27.733, 0.000 ) |
| 5 | ( 14.765, 0.000 ) |

| local_fy(2-5) | local_fx(2-5) |
|---|---|
| 34.998 | 23.276 | local paraxial ray <F3>

| | n | local-ry | local-rx | local-fy | local-fx | local-d | nd |
|---|---|---|---|---|---|---|---|
| FFS | 2 | 445.97671 | −116.91328 | 781.182 | −204.788 | 5.978 | 1.571 |
| FFS-M | 3 | −94.51675 | −54.18392 | 30.084 | 17.246 | −9.200 | −1.571 |
| FFS-M | 4 | 695.55805 | −119.69014 | 221.388 | −38.096 | 24.642 | 1.571 |
| FFS | 5 | 9.28967 | 59.12642 | −16.272 | −103.567 | 0.000 | 1.000 |

| n | hitpoint( y, x ) |
|---|---|
| 2 | ( −3.705, 0.000 ) |
| 3 | ( −8.489, 0.000 ) |
| 4 | ( 1.895, 0.000 ) |
| 5 | ( −1.696, 0.000 ) |

| local_fy(2-5) | local_fx(2-5) |
|---|---|
| 38.858 | 29.056 |

TABLE 4-2

[Data 4] local radius of curvature
(Embodiment 4)

| y-coordinate* | $r_y$ |
|---|---|
| −1.9000 | 8.8834 |
| −1.2793 | 10.3171 |
| −0.6586 | 12.4665 |
| −0.0379 | 15.7231 |
| 0.5828 | 20.9132 |
| 1.2034 | 30.0738 |
| 1.8241 | 49.8287 |
| 2.4448 | 120.3442 |
| 3.0655 | −491.4675 |
| 3.6862 | −91.0857 |
| 4.3069 | −53.9883 |
| 4.9276 | −40.5728 |
| 5.5483 | −34.1075 |
| 6.1690 | −30.7665 |
| 6.7897 | −29.2631 |
| 7.4103 | −29.1339 |
| 8.0310 | −30.3211 |
| 8.6517 | −33.1229 |
| 9.2724 | −38.4231 |
| 9.8931 | −48.6180 |
| 10.5138 | −71.9470 |
| 11.1345 | −164.2528 |
| 11.7552 | 355.8458 |
| 12.3759 | 78.3932 |
| 12.9966 | 42.1716 |
| 13.6172 | 28.0732 |
| 14.2379 | 20.6763 |
| 14.8586 | 16.2036 |
| 15.4793 | 13.2850 |
| 16.1000 | 11.3097 |

*x-coordinate = 0

TABLE 5-1

(general - paraxial axis)

| | n | ry | rx | d | shift | tilt | nd | vd |
|---|---|---|---|---|---|---|---|---|
| | 1 | 0.00000 | 0.00000 | 25.954 | 0.000 | 0.000 | 1.000 | |
| FFS | 2 | −666.60129 | −666.60129 | 9.924 | −8.911 | 8.252 | 1.571 | 33.80 |
| FFS-M | 3 | −0.22716 | −0.22716 | −9.924 | 0.239 | −20.557 | −1.571 | 33.80 |
| FFS-M | 4 | −666.60129 | −666.60129 | 10.219 | −8.941 | 8.252 | 1.571 | 33.80 |
| FFS | 5 | −23.06181 | −23.06181 | 2.839 | 19.252 | 61.622 | 1.000 | |
| | 6 | 0.00000 | 0.00000 | 0.581 | 20.359 | 43.392 | 1.492 | 57.40 |
| | 7 | 0.00000 | 0.00000 | 0.291 | 20.908 | 43.392 | 1.000 | |
| | 8 | 0.00000 | 0.00000 | 0.581 | 21.183 | 43.392 | 1.523 | 58.60 |
| | 9 | 0.00000 | 0.00000 | 0.000 | 21.733 | 43.392 | 1.000 | |
| | 10 | 0.00000 | 0.00000 | 0.000 | 21.733 | 43.392 | 1.000 | |

| | | | | | | |
|---|---|---|---|---|---|---|
| FFS | 2 | $c_1 = 3.3466e+02$ | $c_5 = -2.6759e-03$ | $c_6 = 3.5456e-04$ | $c_{10} = 1.1911e-06$ | $c_{11} = -1.1026e-06$ |
| | | $c_{12} = 6.4071e-07$ | $c_{13} = 1.3778e-07$ | $c_{11} = -1.6232e-07$ | $c_{20} = -4.0759e-09$ | $c_{21} = 2.2710e-09$ |
| | | $c_{22} = 5.2856e-09$ | | | | |
| FFS | 3 | $c_1 = -1.2714e+13$ | $c_5 = -1.5059e-03$ | $c_6 = -3.5873e-03$ | $c_{10} = -1.2357e-05$ | $c_{11} = -3.0320e-06$ |
| | | $c_{12} = 2.1528e-07$ | $c_{13} = -2.6444e-07$ | $c_{14} = 1.141.4e-07$ | $c_{20} = -3.1912e-09$ | $c_{21} = 4.9522e-09$ |
| | | $c_{22} = -4.2420e-09$ | | | | |
| FFS | 4 | $c_1 = 3.3466e+02$ | $c_5 = -2.6759e-03$ | $c_6 = 3.5456e-04$ | $c_{10} = 1.1911e-06$ | $c_{11} = -1.1026e-06$ |
| | | $c_{12} = 6.4071e-07$ | $c_{13} = 1.3778e-07$ | $c_{14} = -1.6232e-07$ | $c_{20} = -4.0759e-09$ | $c_{21} = 2.2710e-09$ |
| | | $c_{22} = 5.2856e-09$ | | | | |
| FFS | 5 | $c_1 = 0.0000e+00$ | $c_5 = -1.3484e-02$ | $c_6 = 1.6005e-02$ | $c_{10} = -9.4533e-04$ | $c_{11} = 4.8741e-04$ |
| | | $c_{12} = 7.3796e-06$ | $c_{13} = -1.8550e-05$ | $c_{14} = 9.8006e-06$ | $c_{20} = 2.3341e-07$ | $c_{21} = -2.1286e-07$ |
| | | $c_{22} = 6.1830e-07$ | | | | |

| n | point ( y, x ) | ry | rx |
|---|---|---|---|
| 2 | ( 0.000, 0.000 ) | 189.661 | −184.077 |
| 3 | ( 0.000, 0.000 ) | −87.460 | −57.293 |
| 4 | ( 0.000, 0.000 ) | 189.661 | −184.077 |
| 5 | ( 0.000, 0.000 ) | 21.098 | −158.353 |

(local - paraxial axis)

| | n | local-ry | local-rx | local-fy | local-fx | local-d | nd |
|---|---|---|---|---|---|---|---|
| FFS | 2 | 244.11375 | −153.33162 | 427.594 | −268.579 | 11.082 | 1.571 |
| FFS-M | 3 | −87.91092 | −57.54242 | 27.981 | 18.315 | −16.476 | −1.571 |
| FFS-M | 4 | −2057.58345 | −90.17763 | −654.906 | −28.703 | 12.991 | 1.571 |
| FFS | 5 | −123.55887 | −55.36101 | 216.428 | 96.971 | 0.000 | 1.000 |

| n | hitpoint( y, x ) |
|---|---|
| 2 | ( 9.004, 0.000 ) |
| 3 | ( 0.175, 0.000 ) |
| 4 | ( 20.655, 0.000 ) |
| 5 | ( 4.998, 0.000 ) |

| local_fy(2-5) | local_fx(2-5) | 2Wy | 2Wx |
|---|---|---|---|
| 26.374 | 26.629 | 36.12 | 47.00 | local paraxial ray <F2>

| | n | local-ry | local-rx | local-fy | local-fx | local-d | nd |
|---|---|---|---|---|---|---|---|
| FFS | 2 | 1057.69028 | −107.45720 | 1852.671 | −188.224 | 15.427 | 1.571 |
| FFS-M | 3 | −72.94286 | −53.85360 | 23.217 | 17.141 | −20.810 | −1.571 |
| FFS-M | 4 | −105.01170 | −55.24810 | −33.424 | −17.585 | 2.748 | 1.571 |
| FFS | 5 | −151.56118 | −34.36288 | 265.478 | 60.191 | 0.000 | 1.000 |

| n | hitpoint( y, x ) |
|---|---|
| 2 | ( 16.906, 0.000 ) |
| 3 | ( 11.599, 0.000 ) |
| 4 | ( 33.239, 0.000 ) |
| 5 | ( 13.537, 0.000 ) |

| local_fy(2-5) | local_fx(2-5) |
|---|---|
| 31.059 | 23.531 |

TABLE 5-1-continued local paraxial ray <F3>

| | n | local-ry | local-rx | local-fy | local-fx | local-d | nd |
|---|---|---|---|---|---|---|---|
| FFS | 2 | 189.26520 | −183.98076 | 331.521 | −322.26.4 | 5.906 | 1.571 |
| FFS-M | 3 | −158.11320 | −60.22179 | 50.326 | 19.168 | −9.090 | −1.571 |
| FFS-M | 4 | 206.66220 | −169.29488 | 65.778 | −53.885 | 25.146 | 1.571 |
| FFS | 5 | 9.22966 | 334.30097 | −16.167 | −585.568 | 0.000 | 1.000 |

| n | hitpoint( y, x ) |
|---|---|
| 2 | ( 0.506, 0.000 ) |
| 3 | ( −10.372, 0.000 ) |
| 4 | ( 6.016, 0.000 ) |
| 5 | ( −2.967, 0.000 ) |

| local_fy(2-5) | local_fx(2-5) |
|---|---|
| 55.549 | 27.766 |

TABLE 5-2

[Data 5] local radius of curvature
(Embodiment 5)

| y-coordinate* | $r_y$ |
|---|---|
| −3.6000 | 8.5925 |
| −2.9655 | 9.2319 |
| −2.3310 | 10.3075 |
| −1.6966 | 11.9332 |
| −1.0621 | 14.3107 |
| −0.4276 | 17.8003 |
| 0.2069 | 23.0802 |
| 0.8414 | 31.5496 |
| 1.4759 | 46.5523 |
| 2.1103 | 78.3212 |
| 2.7448 | 179.2780 |
| 3.3793 | 1e + 04 |

TABLE 5-2-continued

[Data 5] local radius of curvature
(Embodiment 5)

| y-coordinate* | $r_y$ |
|---|---|
| 4.0138 | −231.6989 |
| 4.6483 | −140.4517 |
| 5.2828 | −116.2689 |
| 5.9172 | −112.7114 |
| 6.5517 | −123.7640 |
| 7.1862 | −156.1648 |
| 7.8207 | −246.4409 |
| 8.4552 | −773.4828 |
| 9.0897 | 622.8952 |
| 9.7241 | 231.7668 |
| 10.3586 | 154.4408 |
| 10.9931 | 130.0881 |
| 11.6276 | 133.1475 |
| 12.2621 | 183.1931 |
| 12.8966 | 1009.6971 |
| 13.5310 | −153.6424 |
| 14.1655 | −56.3345 |
| 14.8000 | −29.7871 |

*x-coordinate = 0

TABLE 6-1

(general - paraxial axis)

| | n | ry | rx | d | shift | tilt | nd | vd |
|---|---|---|---|---|---|---|---|---|
| | 1 | 0.00000 | 0.00000 | 25.257 | 0.000 | 0.000 | 1.000 | |
| FFS | 2 | −669.29946 | −669.29946 | 9.504 | −3.602 | 9.954 | 1.571 | 33.80 |
| FFS-M | 3 | −0.22716 | −0.22716 | −9.504 | −1.185 | −18.789 | −1.571 | 33.80 |
| FFS-M | 4 | −669.29946 | −669.29946 | 9.305 | −3.602 | 9.954 | 1.571 | 33.80 |
| FFS | 5 | −23.88523 | −23.88523 | 2.373 | 19.876 | 62.439 | 1.000 | |
| | 6 | 0.00000 | 0.00000 | 0.519 | 21.179 | 49.565 | 1.492 | 57.40 |
| | 7 | 0.00000 | 0.00000 | 0.259 | 21.788 | 49.565 | 1.000 | |
| | 8 | 0.00000 | 0.00000 | 0.519 | 22.093 | 49.565 | 1.523 | 58.60 |
| | 9 | 0.00000 | 0.00000 | 0.000 | 22.701 | 49.565 | 1.000 | |
| | 10 | 0.00000 | 0.00000 | 0.000 | 22.701 | 49.565 | 1.000 | |

FFS 2  $c1 = 4.5114e+02$  $c5 = -2.6693e-03$  $c6 = -2.5529e-04$  $c10 = -3.5332e-06$  $c11 = 6.3235e-06$
       $c12 = 8.6758e-07$  $c13 = 1.4914e-07$  $c14 = -1.2185e-07$  $c20 = -8.9660e-09$  $c21 = 3.8878e-09$
       $c22 = -1.5926e-08$  $c23 = -1.1397e-10$  $c24 = 1.7230e-11$  $c25 = -1.4069e-10$  $c26 = 7.4802e-11$
FFS 3  $c1 = -1.2714e+13$  $c5 = -1.3184e-03$  $c6 = -3.7878e-03$  $c10 = -1.2114e-05$  $c11 = 1.1825e-05$
       $c12 = 3.8025e-07$  $c13 = -3.6426e-07$  $c14 = 5.2302e-08$  $c20 = 1.2051e-09$  $c21 = -6.0337e-10$
       $c22 = -8.3269e-09$  $c23 = -7.3791e-11$  $c24 = -4.0498e-11$  $c25 = 1.3995e-10$  $c26 = -6.0426e-11$

TABLE 6-1-continued

| FFS | 4 | c1 = 4.5114e+02 | c5 = −2.6693e−03 | c6 = −2.5529e−04 | c10 = −3.5332e−06 | c11 = 6.3235e−06 |
|---|---|---|---|---|---|---|
| | | c12 = 8.6758e−07 | c13 = 1.4914e−07 | c14 = −1.2185e−07 | c20 = −8.9660e−09 | c21 = 3.8878e−09 |
| | | c22 = −1.5926e−08 | c23 = −1.1397e−10 | c24 = 1.7230e−11 | c25 = −1.4069e−10 | c26 = 7.4802e−11 |
| FFS | 5 | c1 = 0.0000e+00 | c5 = −9.1550e−03 | c6 = 1.7094e−02 | c10 = −1.2561e−03 | c11 = 6.5686e−04 |
| | | c12 = 1.0685e−05 | c13 = −2.3534e−05 | c14 = 8.5790e−06 | c20 = 4.0888e−07 | c21 = 1.9559e−07 |
| | | c22 = −9.6344e−08 | c23 = −5.1025e−09 | c24 = 3.2427e−09 | c25 = 1.7980e−09 | c26 = −4.2699e−09 |

| n | point ( y, x ) | ry | rx |
|---|---|---|---|
| 2 | ( 0.000, 0.000 ) | 353.896 | −127.335 |
| 3 | ( 0.000, 0.000 ) | −79.297 | −55.928 |
| 4 | ( 0.000, 0.000 ) | 353.896 | −127.335 |
| 5 | ( 0.000, 0.000 ) | 22.432 | 121.494 |

(local - paraxial axis)

| | n | local-ry | local-rx | local-fy | local-fx | local-d | nd |
|---|---|---|---|---|---|---|---|
| FFS | 2 | 444.38277 | −125.36690 | 778.390 | −219.595 | 10.738 | 1.571 |
| FFS-M | 3 | −77.12079 | −56.17658 | 24.547 | 17.880 | −15.768 | −1.571 |
| FFS-M | 4 | −354.11260 | −99.83793 | −112.710 | −31.777 | 13.938 | 1.571 |
| FFS | 5 | −28.74063 | −179.87485 | 50.343 | 315.072 | 0.000 | 1.000 |

| n | hitpoint( y, x ) |
|---|---|
| 2 | ( 3.654, 0.000 ) |
| 3 | ( 1.925, 0.000 ) |
| 4 | ( 14.182, 0.000 ) |
| 5 | ( 4.560, 0.000 ) |

| local__fy(2-5) | local__fx(2-5) | 2Wy | 2Wx |
|---|---|---|---|
| 24.087 | 26.337 | 36.12 | 47.00 | local paraxial ray <F2>

| | n | local-ry | local-rx | local-fy | local-fx | local-d | nd |
|---|---|---|---|---|---|---|---|
| FFS | 2 | −862.80582 | −107.55598 | −1511.308 | −188.397 | 14.968 | 1.571 |
| FFS-M | 3 | −71.77438 | −54.82185 | 22.845 | 17.449 | −20.428 | −1.571 |
| FFS-M | 4 | −570.18686 | −76.75853 | −181.484 | −24.431 | 3.167 | 1.571 |
| FFS | 5 | 15.99465 | −126.44882 | −28.017 | 221.490 | 0.000 | 1.000 |

| n | hitpoint( y, x ) |
|---|---|
| 2 | ( 11.387, 0.000 ) |
| 3 | ( 12.974, 0.000 ) |
| 4 | ( 26.448, 0.000 ) |
| 5 | ( 13.188, 0.000 ) |

| local__fy(2-5) | local__fx(2-5) |
|---|---|
| 35.562 | 23.660 | local paraxial ray <F3>

| | n | local-ry | local-rx | local-fy | local-fx | local-d | nd |
|---|---|---|---|---|---|---|---|
| FFS | 2 | 284.27936 | −120.60709 | 497.949 | −211.258 | 5.470 | 1.571 |
| FFS-M | 3 | −115.53095 | −54.92082 | 36.772 | 17.481 | −8.381 | −1.571 |
| FFS-M | 4 | 352.71584 | −127.30729 | 112.266 | −40.520 | 25.592 | 1.571 |
| FFS | 5 | 7.70555 | 50.94777 | −13.497 | −89.241 | 0.000 | 1.000 |

| n | hitpoint( y, x ) |
|---|---|
| 2 | ( −5.011, 0.000 ) |
| 3 | ( −8.614, 0.000 ) |
| 4 | ( −0.094, 0.000 ) |
| 5 | ( −3.295, 0.000 ) |

| local__fy(2-5) | local__fx(2-5) |
|---|---|
| 54.330 | 29.743 |

TABLE 6-2

[Data 6] local radius of curvature
(Embodiment 6)

| y-coordinate* | $r_y$ |
|---|---|
| −3.6000 | 7.4848 |
| −2.9759 | 8.0431 |
| −2.3517 | 9.0646 |
| −1.7276 | 10.6981 |
| −1.1034 | 13.2438 |
| −0.4793 | 17.3381 |
| 0.1448 | 24.5316 |
| 0.7690 | 39.7068 |
| 1.3931 | 89.8809 |
| 2.0172 | −746.4355 |
| 2.6414 | −82.1247 |
| 3.2655 | −46.8473 |
| 3.8897 | −34.7324 |
| 4.5138 | −29.0315 |
| 5.1379 | −26.1486 |

TABLE 6-2-continued

[Data 6] local radius of curvature
(Embodiment 6)

| y-coordinate* | $r_y$ |
|---|---|
| 5.7621 | −24.9103 |
| 6.3862 | −24.9084 |
| 7.0103 | −26.1122 |
| 7.6345 | −28.8376 |
| 8.2586 | −34.0132 |
| 8.8828 | −44.2827 |
| 9.5069 | −69.8307 |
| 10.1310 | −213.8078 |
| 10.7552 | 157.9930 |
| 11.3793 | 53.4206 |
| 12.0034 | 30.7443 |
| 12.6276 | 20.9443 |
| 13.2517 | 15.5648 |
| 13.8759 | 12.2469 |
| 14.5000 | 10.0820 |

*x-coordinate = 0

TABLE 7-1

(general - paraxial axis)

| | n | ry | rx | d | shift | tilt | nd | vd |
|---|---|---|---|---|---|---|---|---|
| | 1 | 0.00000 | 0.00000 | 22.366 | 0.000 | 0.000 | 1.000 | |
| FFS | 2 | −658.97901 | −658.97901 | 10.375 | −6.467 | 2.752 | 1.747 | 49.83 |
| FFS-M | 3 | −0.22716 | −0.22716 | −10.375 | −0.696 | −24.218 | −1.747 | 49.83 |
| FFS-M | 4 | −658.97901 | −658.97901 | 14.680 | −6.467 | 2.752 | 1.747 | 49.83 |
| FFS | 5 | −32.02861 | −32.02861 | −6.231 | 19.111 | 63.440 | 1.000 | |
| | 6 | 0.00000 | 0.00000 | 0.581 | 24.887 | 54.449 | 1.492 | 57.40 |
| | 7 | 0.00000 | 0.00000 | 0.233 | 25.701 | 54.449 | 1.000 | |
| | 8 | 0.00000 | 0.00000 | 0.125 | 26.026 | 54.449 | 1.600 | 50.00 |
| | 9 | 0.00000 | 0.00000 | 0.320 | 26.201 | 54.449 | 1.450 | 50.00 |
| | 10 | 0.00000 | 0.00000 | 0.000 | 26.648 | 54.449 | 1.000 | |
| | 11 | 0.00000 | 0.00000 | 0.000 | 26.648 | 54.449 | 1.000 | |

| | | | | | | |
|---|---|---|---|---|---|---|
| FFS | 2 | $c1 = 3.3072e+02$ | $c5 = -2.8162e-03$ | $c6 = -7.9252e-04$ | $c10 = 4.2463e-07$ | $c11 = 9.8007e-06$ |
| | | $c12 = 5.7059e-07$ | $c13 = 3.8846e-09$ | $c14 = -1.2787e-07$ | $c20 = -6.8490e-09$ | $c21 = 9.4977e-10$ |
| | | $c22 = -5.4998e-09$ | $c23 = -1.5307e-10$ | $c24 = -1.5826e-11$ | $c25 = -8.1039e-11$ | $c26 = 4.5643e-11$ |
| FFS | 3 | $c1 = -1.2714e+13$ | $c5 = -1.4373e-03$ | $c6 = -4.1046e-03$ | $c10 = -7.4252e-06$ | $c11 = 1.9717e-06$ |
| | | $c12 = 2.4499e-07$ | $c13 = -2.2269e-07$ | $c14 = -1.0824e-07$ | $c20 = -9.1900e-10$ | $c21 = 2.0952e-09$ |
| | | $c22 = -4.3397e-09$ | $c23 = -4.9844e-11$ | $c24 = -7.6141e-12$ | $c25 = 3.5955e-11$ | $c26 = -2.8168e-11$ |
| FFS | 4 | $c1 = 3.3072e+02$ | $c5 = -2.8162e-03$ | $c6 = -7.9252e-04$ | $c10 = 4.2463e-07$ | $c11 = 9.8007e-06$ |
| | | $c12 = 5.7059e-07$ | $c13 = 3.8846e-09$ | $c14 = -1.2787e-07$ | $c20 = -6.8490e-09$ | $c21 = 9.4977e-10$ |
| | | $c22 = -5.4998e-09$ | $c23 = -1.5307e-10$ | $c24 = -1.5826e-11$ | $c25 = -8.1039e-11$ | $c26 = 4.5643e-11$ |
| FFS | 5 | $c1 = 0.0000e+00$ | $c5 = -1.5816e-02$ | $c6 = 1.7948e-02$ | $c10 = -1.2828e-03$ | $c11 = 4.7482e-04$ |
| | | $c12 = -1.1153e-06$ | $c13 = -1.7060e-05$ | $c14 = 8.0838e-06$ | $c20 = 3.2681e-07$ | $c21 = 1.9881e-07$ |
| | | $c22 = 1.8547e-07$ | $c23 = 8.6872e-10$ | $c24 = 4.2965e-09$ | $c25 = 3.4256e-10$ | $c26 = -3.3653e-09$ |

| n | point ( y, x ) | ry | rx |
|---|---|---|---|
| 2 | ( 0.000, 0.000 ) | 1056.601 | −96.913 |
| 3 | ( 0.000, 0.000 ) | −73.328 | −51.569 |
| 4 | ( 0.000, 0.000 ) | 1056.601 | −96.913 |
| 5 | ( 0.000, 0.000 ) | 13.888 | 111.822 |

(local - paraxial axis)

| | n | local-ry | local-rx | local-fy | local-fx | local-d | nd |
|---|---|---|---|---|---|---|---|
| FFS | 2 | 8166.06702 | −96.21879 | 10928.274 | −128.765 | 11.075 | 1.747 |
| FFS-M | 3 | −73.10573 | −51.73733 | 20.920 | 14.805 | −17.584 | −1.747 |
| FFS-M | 4 | −234.09703 | −72.77951 | −66.990 | −20.827 | 12.940 | 1.747 |
| FFS | 5 | −47.72389 | −73.05180 | 63.867 | 97.762 | 0.000 | 1.000 |

TABLE 7-1-continued

| n | hitpoint( y, x ) |
|---|---|
| 2 | ( 6.474, 0.000 ) |
| 3 | ( 0.990, 0.000 ) |
| 4 | ( 19.761, 0.000 ) |
| 5 | ( 9.785, 0.000 ) |

| local_fy(2-5) | local_fx(2-5) | 2Wy | 2Wx |
|---|---|---|---|
| 22.942 | 22.636 | 43.48 | 56.00 | local paraxial ray <F2>

| | n | local-ry | local-rx | local-fy | local-fx | local-d | nd |
|---|---|---|---|---|---|---|---|
| FFS | 2 | −341.12330 | −82.72022 | −456.510 | −110.701 | 15.949 | 1.747 |
| FFS-M | 3 | −62.96540 | −48.19943 | 18.019 | 13.793 | −21.940 | −1.747 |
| FFS-M | 4 | −551.16001 | −47.08538 | −157.723 | −13.474 | 2.284 | 1.747 |
| FFS | 5 | 7.71208 | −131.65282 | −10.321 | 176.185 | 0.000 | 1.000 |

| n | hitpoint( y, x ) |
|---|---|
| 2 | ( 15.123, 0.000 ) |
| 3 | ( 13.763, 0.000 ) |
| 4 | ( 32.806, 0.000 ) |
| 5 | ( 17.804, 0.000 ) |

| local_fy(2-5) | local_fx(2-5) |
|---|---|
| 38.044 | 18.307 | local paraxial ray <F3>

| | n | local-ry | local-rx | local-fy | local-fx | local-d | nd |
|---|---|---|---|---|---|---|---|
| FFS | 2 | 931.59234 | −94.91291 | 1246.707 | −127.018 | 5.392 | 1.747 |
| FFS-M | 3 | −91.48958 | −50.68152 | 26.181 | 14.503 | −9.188 | −1.747 |
| FFS-M | 4 | 1606.65061 | −97.62818 | 459.768 | −27.938 | 26.294 | 1.747 |
| FFS | 5 | 20.03682 | 208.03029 | −26.814 | −278.397 | 0.000 | 1.000 |

| n | hitpoint( y, x ) |
|---|---|
| 2 | ( −2.505, 0.000 ) |
| 3 | ( −10.508, 0.000 ) |
| 4 | ( 3.772, 0.000 ) |
| 5 | ( 0.884, 0.000 ) |

| local_fy(2-5) | local_fx(2-5) |
|---|---|
| 25.536 | 26.699 |

TABLE 7-2

[Data 7] local radius of curvature (Embodiment 7)

| y-coordinate* | $r_y$ |
|---|---|
| 0.4000 | 16.1922 |
| 1.0276 | 21.4970 |
| 1.6552 | 30.7246 |
| 2.2828 | 50.1034 |
| 2.9103 | 114.0940 |
| 3.5379 | −944.3808 |
| 4.1655 | −104.8958 |
| 4.7931 | −60.0292 |
| 5.4207 | −44.6233 |
| 6.0483 | −37.3936 |
| 6.6759 | −33.7800 |
| 7.3034 | −32.3183 |
| 7.9310 | −32.5476 |
| 8.5586 | −34.5599 |
| 9.1862 | −39.0875 |
| 9.8138 | −48.3216 |
| 10.4414 | −69.9215 |
| 11.0690 | −155.3857 |
| 11.6966 | 346.8114 |
| 12.3241 | 73.2832 |
| 12.9517 | 38.6994 |
| 13.5793 | 25.3657 |
| 14.2069 | 18.4289 |
| 14.8345 | 14.2751 |
| 15.4621 | 11.5998 |
| 16.0897 | 9.8260 |
| 16.7172 | 8.6666 |
| 17.3448 | 7.9717 |
| 17.9724 | 7.6658 |
| 18.6000 | 7.7205 |

*x-coordinate = 0

TABLE 8

(general - paraxial axis)

| | n | ry | rx | d | shift | tilt | nd | vd |
|---|---|---|---|---|---|---|---|---|
| | 1 | 0.00000 | 0.00000 | 10.000 | 0.000 | 0.000 | 1.000 | |
| FFS | 2 | 0.00000 | 0.00000 | 6.309 | 10.303 | −5.975 | 1.571 | 33.80 |
| FFS | 3 | 0.22716 | 0.22716 | 0.000 | −1.375 | 20.930 | 1.571 | 33.80 |
| FFS | 4 | 0.22716 | 0.22716 | 9.775 | −1.375 | 20.930 | 1.571 | 33.80 |
| FFS | 5 | 662.03558 | 662.03558 | 24.840 | −4.558 | −6.359 | 1.000 | |
| | 6 | 0.00000 | 0.00000 | 23.637 | 0.000 | 0.000 | 1.000 | |
| | 7 | 0.00000 | 0.00000 | 0.000 | 0.000 | 0.000 | 1.000 | |

| | | | | | | |
|---|---|---|---|---|---|---|
| FFS | 2 | $c_1 = 0.0000e+00$ | $c_5 = 1.9999e−03$ | $c_6 = 1.2851e−03$ | $c_{10} = 1.9383e−05$ | $c_{11} = 6.4896e−06$ |
| | | $c_{12} = −1.6583e−07$ | $c_{13} = −3.4712e−08$ | $c_{14} = 1.2171e−07$ | $c_{20} = −1.0498e−09$ | $c_{21} = 9.0350e−10$ |
| | | $c_{22} = 1.6886e−09$ | $c_{23} = 4.2104e−12$ | $c_{24} = 4.0011e−12$ | $c_{25} = 2.2580e−11$ | $c_{26} = −1.0080e−11$ |
| FFS | 3 | $c_1 = −1.2714e+13$ | $c_5 = 1.2936e−03$ | $c_6 = 3.8853e−03$ | $c_{10} = 7.6989e−06$ | $c_{11} = −5.7988e−06$ |
| | | $c_{12} = −2.8169e−07$ | $c_{13} = 2.3948e−07$ | $c_{14} = 3.4805e−08$ | $c_{20} = −7.4620e−11$ | $c_{21} = −6.9342e−10$ |
| | | $c_{22} = 6.2799e−09$ | $c_{23} = 3.9722e−11$ | $c_{24} = 3.5429e−12$ | $c_{25} = −7.3572e−11$ | $c_{26} = 3.0433e−11$ |
| FFS | 4 | $c_1 = −1.2714e+13$ | $c_5 = 1.2936e−03$ | $c_6 = 3.8853e−03$ | $c_{10} = 7.6989e−06$ | $c_{11} = −5.7988e−06$ |
| | | $c_{12} = −2.8169e−07$ | $c_{13} = 2.3948e−07$ | $c_{14} = 3.4805e−08$ | $c_{20} = −7.4620e−11$ | $c_{21} = −6.9342e−10$ |
| | | $c_{22} = 6.2799e−09$ | $c_{23} = 3.9722e−11$ | $c_{24} = 3.5429e−12$ | $c_{25} = −7.3572e−11$ | $c_{26} = 3.0433e−11$ |
| FFS | 5 | $c_1 = 3.2961e+02$ | $c_5 = 2.5107e−03$ | $c_6 = 4.5579e−04$ | $c_{10} = 4.4834e−06$ | $c_{11} = −7.6751e−06$ |
| | | $c_{12} = −6.1053e−07$ | $c_{13} = 1.4681e−08$ | $c_{14} = 9.4057e−08$ | $c_{20} = 7.2362e−09$ | $c_{21} = −7.9987e−10$ |
| | | $c_{22} = 3.7631e−09$ | $c_{23} = 4.7877e−11$ | $c_{24} = 1.6833e−11$ | $c_{25} = 7.9375e−11$ | $c_{26} = −4.5408e−11$ |

| n | point ( y, x ) | ry | rx |
|---|---|---|---|
| 2 | ( 0.000, 0.000 ) | 878.095 | 109.424 |
| 3 | ( 0.000, 0.000 ) | 76.607 | 54.870 |
| 4 | ( 0.000, 0.000 ) | 76.607 | 54.870 |
| 5 | ( 0.000, 0.000 ) | −592.175 | 119.707 |

(local - paraxial axis)

| | n | local-ry | local-rx | local-fy | local-fx | local-d | nd |
|---|---|---|---|---|---|---|---|
| FFS | 2 | −1034.77779 | 122.98480 | −1812.537 | 215.423 | 6.644 | 1.571 |
| FFS | 3 | 75.58030 | 55.05714 | 0.000 | 0.000 | 0.000 | 1.571 |
| FFS | 4 | 75.58030 | 55.05714 | 0.000 | 0.000 | 10.940 | 1.571 |
| FFS | 5 | −1029.41938 | 117.71745 | 1803.151 | −206.196 | 0.000 | 1.000 |

| n | hitpoint( y, x ) |
|---|---|
| 2 | ( −9.681, 0.000 ) |
| 3 | ( 1.914, 0.000 ) |
| 4 | ( 1.914, 0.000 ) |
| 5 | ( 4.586, 0.000 ) |

| local_fy(2-5) | local_fx(2-5) | 2Wy | 2Wx |
|---|---|---|---|
| 158809.450 | 22575.644 | 36.12 | 47.00 |

The present invention permits formation of the compact display optical system and achievement of the image display apparatus optimal for the HMDs with wide angles of view and with good correction for the distortion and various aberrations.

In addition, the present invention permits attainment of the image display apparatus that allows the observer to observe the image information with a wide angle of view and with good image quality while decreasing the lose of optical amount and the size of the entire apparatus, by properly setting the structure of the display optical system including the free surface prism body for guiding the light from the display means to the observers eyes in order to permit the observer to observe the image information displayed on the display means such as the liquid crystal display or the like.

What is claimed is:

1. An image display apparatus comprising display means for displaying image information, and optical means for guiding light from the display means to the eye, wherein said optical means comprises a prism body of a positive refractive power having three or more surfaces with refractive powers differing depending upon azimuthal angles, and wherein a surface of the prism body closest to the display means is a surface in which refractive powers thereof differ depending upon azimuthal angles and in which a local curvature radius area having a positive refractive power on a local generating-line section (meridional section) is interposed between local curvature radius areas having a negative refractive power on the local generating-line section (meridional section).

2. The image display apparatus of claim 1 wherein said prism body comprises a transmitting surface, a reflecting surface, and a reflecting surface in the order named in the opposite direction to passage of light, from the surface closest to the eye, and refractive powers on a local sagittal section at hit points between the respective surfaces of the prism body and a reference ray are arranged in such arrangement that the transmitting surface of a negative refractive power, the reflecting surface of a positive refractive power, and the reflecting surface of a negative refractive power are arranged in the order named in the opposite direction to passage of light, from the eye side.

3. The image display apparatus of claim 1 or 2 wherein the following condition is satisfied by a refractive index Nd of a material of said prism body:

1.54<Nd<1.85.

4. The image display apparatus of claim 2 wherein the following condition is satisfied by an angle a between the reference ray and a tangent line to the surface closest to the eye on the local generating-line section (meridional section) at the hit point between the reference ray and the surface of said prism body closest to the eye;

70°<α<95°.

5. The image display apparatus of claim 3 wherein the following condition is satisfied by an angle a between the reference ray and a tangent line to the surface closest to the eye on the local generating-line section (meridional section) at the hit point between the reference ray and the surface of said prism body closest to the eye;

70°<α<95°.

6. The image display apparatus of claim 1 or 2 wherein said prism body comprises a transmitting surface, a reflecting surface, and a reflecting surface arranged in the order stated from the surface closest to said display means and wherein refractive powers on the local generating-line section (meridional section) at a hit point on each surface of the prism body, of a ray passing the center of the eye and a most marginal image on the far side from the eye out of most marginal images on the local generating-line section (meridional section) of the display means, are arranged in such arrangement that the transmitting surface of a negative refractive power, the reflecting surface of a positive refractive power, and the reflecting surface of a positive refractive power are placed in the order stated from the display means side.

7. The image display apparatus of claim 3 wherein said prism body comprises a transmitting surface, a reflecting surface, and a reflecting surface arranged in the order stated from the surface closest to said display means and wherein refractive powers on the local generating-line section (meridional section) at a hit point on each surface of the prism body, of a ray passing the center of the eye and a most marginal image on the far side from the eye out of most marginal images on the local generating-line section (meridional section) of the display means, are arranged in such arrangement that the transmitting surface of a negative refractive power, the reflecting surface of a positive refractive power, and the reflecting surface of a positive refractive power are placed in the order stated from the display means side.

8. The image display apparatus of claim 6 wherein the surface closest to the eye is a surface having two functions of transmitting action and reflecting action.

9. The image display apparatus of claim 7 wherein the surface closest to the eye is a surface having two functions of transmitting action and reflecting action.

10. An image display apparatus comprising display means for displaying image information, optical means for guiding light from the display means to the eye, and seethrough means for guiding light from the outside to the eye, wherein said optical means comprises a prism body of a positive refractive power comprised of three or more different surfaces, inclusive of two or more surfaces with refractive powers differing depending upon azimuthal angles, wherein said seethrough means is constructed in such structure that a correction prism is placed adjacent to or joined to said prism body in said optical means, that adjacent surfaces or joint surfaces are partially transmitting surfaces with little optical refractive power, and that the eye optical axis is approximately aligned with the outside optical axis, wherein a surface of the seethrough means closest to the outside is a decentered, curved surface which has a shape different from that of a surface of the seethrough means closest to the eye and in which refractive powers differ depending upon azimuthal angles, and wherein the following condition is satisfied by a curvature radius 1_ry on a local generating-line section (meridional section) and a curvature radius 1_rx on a local sagittal section at a hit point between a reference ray and the decentered, curved surface of the seethrough means closest to the outside:

|1_rx|<|1_ry|.

11. The image display apparatus of claim 10 wherein said correction prism is placed in an outside region of said prism body.

* * * * *

UNITED STATES PATENT AND TRADEMARK OFFICE
CERTIFICATE OF CORRECTION

PATENT NO. : 6,384,983 B1
DATED : May 7, 2002
INVENTOR(S) : Shoichi Yamazaki

It is certified that error appears in the above-identified patent and that said Letters Patent is hereby corrected as shown below:

<u>Column 2,</u>
Line 47, "a" should read -- α --.

<u>Column 3,</u>
Line 4, "an" should be deleted.

<u>Column 4,</u>
Line 17, "other region" should read -- region other --; and
Line 20, "the both" should read -- both --.

<u>Column 7,</u>
Lines 19 and 23, "a" should read -- α --.

<u>Column 8,</u>
Line 11, "the both" should read -- both --; and
Line 15, "action-are" should read -- action are --.

<u>Column 12,</u>
Line 35, "Abbels" should read -- Abbe's --; and
Line 51, "and"tilt"" should read -- and "tilt" --.

<u>Column 13,</u>
Line 13, "$y^5$) +" should read -- $y^6$) + --.

<u>Column 15,</u>
Table 1-1, "(607)" should read -- (6-7) --.

<u>Column 31,</u>
Table 5-1, "27.766" should read -- 27.786 --.

<u>Column 39,</u>
Line 54, "lose" should read -- loss --; and
Line 58, "observers" should read -- observer's --.

<u>Column 40,</u>
Line 50, "angles" should read -- angles, --; and
Line 56, "claim 1" should read -- claim 1, --.

UNITED STATES PATENT AND TRADEMARK OFFICE
CERTIFICATE OF CORRECTION

PATENT NO. : 6,384,983 B1
DATED : May 7, 2002
INVENTOR(S) : Shoichi Yamazaki

It is certified that error appears in the above-identified patent and that said Letters Patent is hereby corrected as shown below:

Column 41,
Lines 1 and 23, "or 2" should read -- or 2, --;
Line 6, "claim 2" should read -- claim 2, --;
Lines 7 and 16, "a" should read -- $\alpha$ --;
Lines 11 and 20, "eye;" should read -- eye: --;
Lines 15 and 38, "claim 3" should read -- claim 3, --.

Column 42,
Line 9, "claim 6" should read -- claim 6, --;
Line 12, "claim 7" should read -- claim 7, --; and
Line 40, "claim 10" should read -- claim 10, --.

Signed and Sealed this

Eleventh Day of February, 2003

JAMES E. ROGAN
*Director of the United States Patent and Trademark Office*